United States Patent
Matsunaga et al.

[11] Patent Number: 5,949,502
[45] Date of Patent: Sep. 7, 1999

[54] LIQUID CRYSTAL DEVICE HAVING RESISTOR ELEMENTS

[75] Inventors: Kuniyuki Matsunaga, Mobara; Makoto Tsumura, Hitachi; Junichi Ohwada, Mobara; Masahiko Suzuki, Mobara; Shiro Ueda, Mobara, all of Japan

[73] Assignee: Hitachi, Ltd., Tokyo, Japan

[21] Appl. No.: 08/973,838

[22] PCT Filed: Aug. 7, 1995

[86] PCT No.: PCT/JP95/01564

§ 371 Date: Dec. 17, 1997

§ 102(e) Date: Dec. 17, 1997

[87] PCT Pub. No.: WO97/06465

PCT Pub. Date: Feb. 20, 1997

[51] Int. Cl.[6] .......................... G02F 1/1333; G02F 1/136
[52] U.S. Cl. ................................ 349/40; 349/42
[58] Field of Search ........................ 349/40, 42

[56] References Cited

U.S. PATENT DOCUMENTS

| | | | |
|---|---|---|---|
| 4,807,973 | 2/1989 | Kawasaki | 350/332 |
| 5,233,448 | 8/1993 | Wu | 359/59 |
| 5,323,254 | 6/1994 | Pitt | 359/60 |
| 5,652,632 | 7/1997 | Shimizu | 349/40 |
| 5,668,032 | 9/1997 | Holmberg et al. | 349/40 |
| 5,691,787 | 11/1997 | Shimada et al. | 349/40 |
| 5,748,179 | 5/1998 | Ito et al. | 349/152 |

*Primary Examiner*—William L. Sikes
*Assistant Examiner*—Tarifur Chowdhury
*Attorney, Agent, or Firm*—Antonelli, Terry, Stout & Kraus, LLP

[57] ABSTRACT

A liquid crystal display device in which counter-measures are taken for static electricity from the step of forming wiring lines of a substrate on the side where thin film transistors or switching elements are formed to the step of completing module mounting is suited for improving the productivity and for lowering the production cost of the display device. For this purpose, the liquid crystal display device is characterized in that resistor elements for connecting gate lines or drain lines are disposed inside a seal and are arranged in one or more lines outside an effective pixel region, or additional gate lines and additional pixels are arranged in a plurality of lines outside the first gate line or the last gate line in the effective pixel region, and the additional gate lines are short-circuited with each other at their end portions.

6 Claims, 27 Drawing Sheets

WI = 26.5 μm

•— LI = 12.5 μm

▲— LI = 32.0 μm

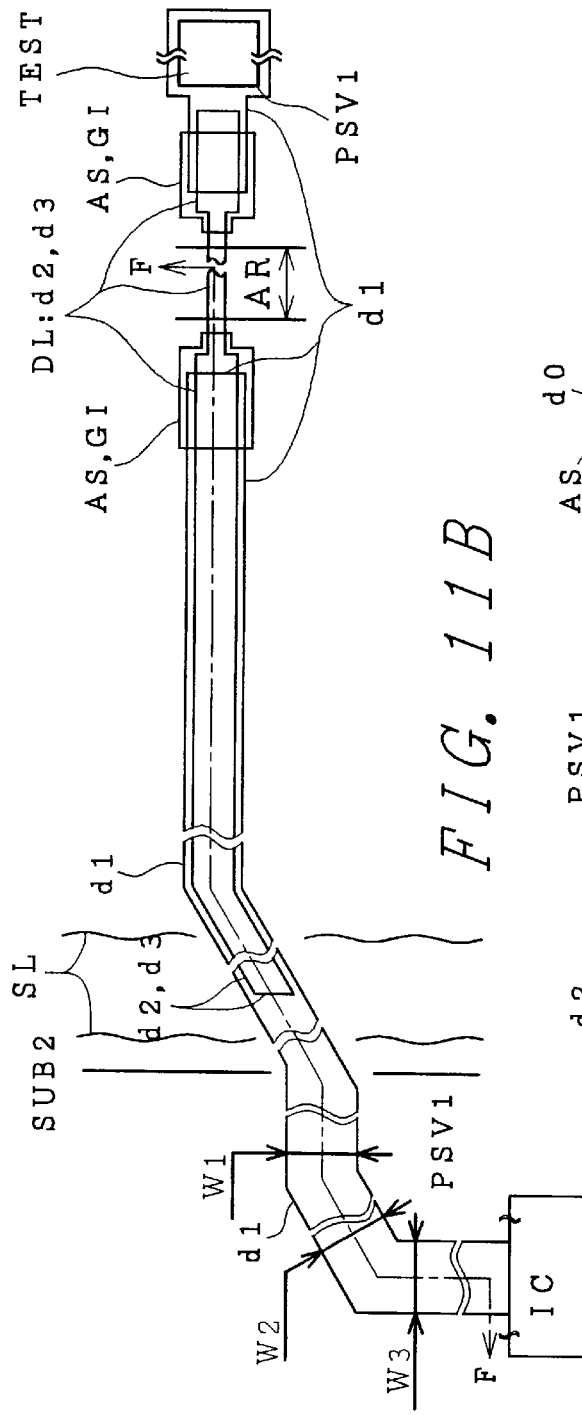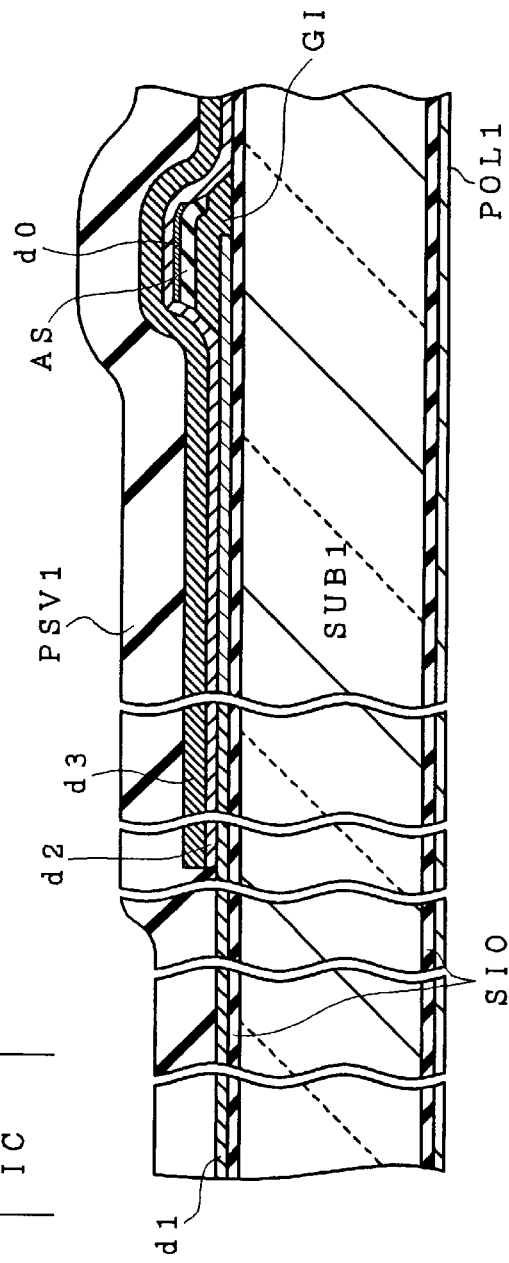
FIG. 11A
FIG. 11B

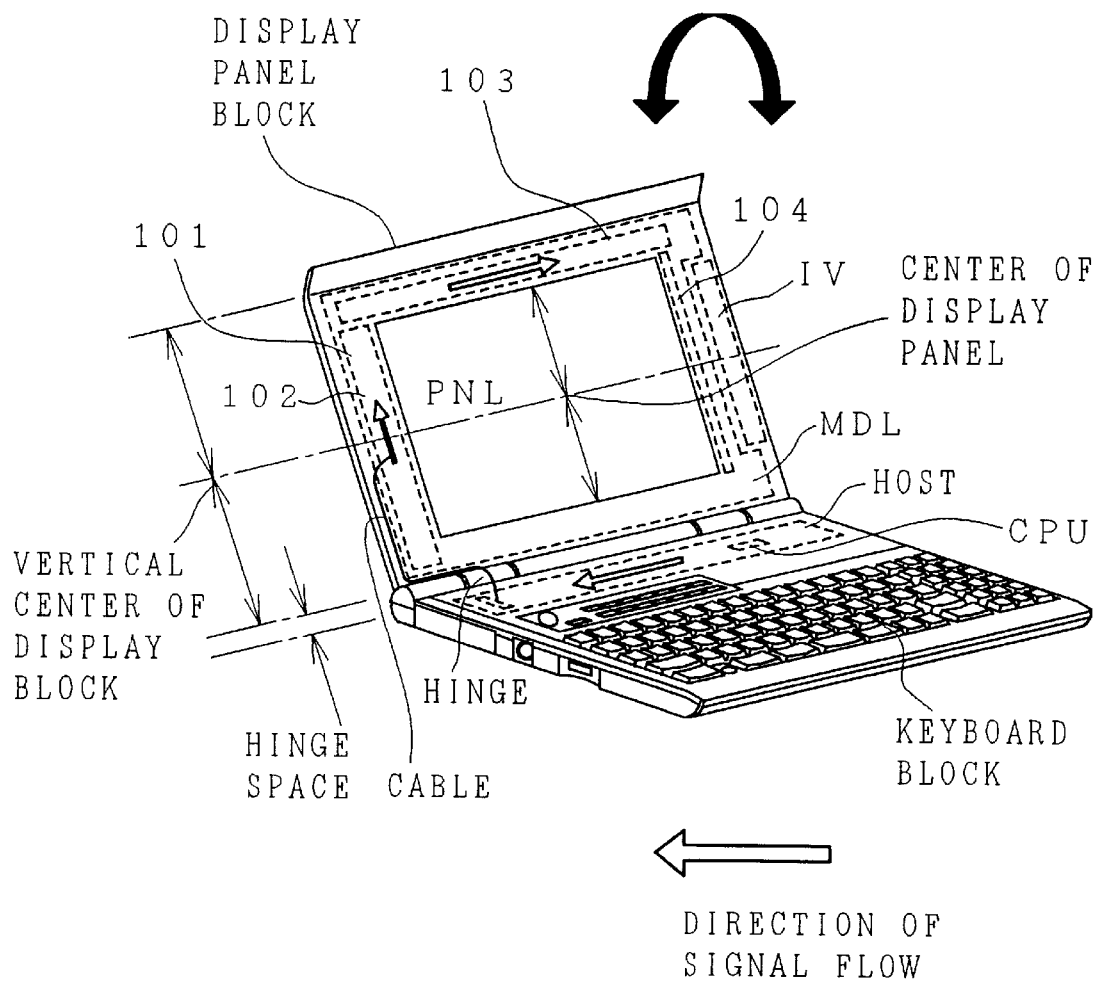

LIQUID CRYSTAL DEVICE HAVING RESISTOR ELEMENTS

DESCRIPTION

1. Technical Field

The present invention relates to an active matrix liquid crystal display device and, more particularly, to a structure of an active matrix substrate suitable for counter-measures for static electricity.

2. Background Art

In the liquid crystal display element (i.e., the liquid crystal display module) of an active matrix liquid crystal device, for example, on the face, opposed to a liquid crystal layer, of one substrate of two transparent insulating substrates of glass opposed to each other through a liquid crystal layer, there are formed a group of gate lines juxtaposed in a direction Y and a group of drain lines juxtaposed in a direction X, extended in the direction Y and insulated from the gate lines.

These gate lines and drain lines individually define their enclosed regions as pixel regions, in which switching elements such as thin film transistors (TFT) and transparent pixel electrodes are respectively formed.

When scanning signals are fed to the gate lines, the thin film transistors are turned on to feed video signals therethrough from the drain lines to the pixel electrodes.

Not only the individual drain lines group but also the individual gate lines group are extended to the periphery of the transparent insulating substrate to constitute external terminals which are connected with video drive circuits and gate scanning drive circuits, i.e., a plurality of drive ICs (of a semiconductor integrated circuit) externally arranged in the periphery of the transparent insulating substrate. In other words, a plurality of tape carrier packages (TCP) mounted with the individual drive ICs are arranged in the periphery of the substrate.

However, since the transparent insulating substrate is equipped in its periphery with the TCP mounted with drive ICs, the circuits enlarges the area of the region (widely called the picture frame) between the contour of the display region constructed of the intersecting regions of the gate lines and the drain lines of the transparent insulating substrate, and the contour of the outer frame of the transparent insulating substrate. This enlarged area is contrary to the request that the external size of the liquid crystal display module be reduced.

In order to solve this problem, i.e., to increase the density of the liquid crystal display element and to minimize its external size, therefore, there has been proposed a structure in which no TCP part is used but video drive ICs and gate scanning drive ICs are mounted directly on the transparent insulating substrate. This mounting method is termed the flip-chip method or the chip-on glass (COG) method.

The invention can be applied not only to the mounting method using TCP parts but also to the flip-chip mounting.

However, the aforementioned structure of the liquid crystal display element of the prior art is insufficient for the counter-measures for static electricity (dielectric breakage) generated in the manufacture process till the module is completed. Specifically, the static electricity is generated at steps after the film formation by plasma CVD, and at the rubbing step after application of the alignment film because the rubbing cloth comes into contact with the substrate surface. As a defect mode, therefore, the characteristics of the thin film transistors (TFT) or the switching elements extremely weak to the static electricity become deteriorated, causing uneven display on the screen. Further the drain lines may be disconnected, or the insulating layer between the gate lines and the drain lines may be destroyed, causing short-circuit. At the substrate cutting step, moreover, static electricity is produced by the cuffing operation itself, if this operation entails mechanical contact with a diamond cutter, causing asimilar defect. At the step of applying aseal member, at the step of joining the two opposed substrates together or at the step of sealing in a liquid crystal or at the sealing step, static electricity is produced and invade the substrate on the side having the thin film transistors, causing a similar defect. At the step of mounting module parts after the liquid crystal display panel having two opposed substrates adhered to each other is completed, too, static electricity is produced at the time of thermosetting-bonding the TCP parts, at the time of sticking a rubber cushion or at the time of mounting a driving semiconductor chip in the flip-chip mounting. The static electricity thus produced invades from the terminal portion of the periphery of the substrate on the side having the thin film transistors of the liquid crystal display cells, thereby causing a similar defect.

Means for solving these problems are disclosed, for example, in Japanese Patent Laid-Open Nos. 85586/1988, 106788/1988 and 220289/1988.

The means disclosed in Japanese Patent Laid-Open No. 85586/1988 is characterized in that the grouped gate lines and the grouped drain lines are connected at their end portions with short-circuiting lines through impedance elements and static electricity having invaded is dispersed by the actions of the short-circuiting lines and the impedance elements.

The means disclosed in Japanese Patent Laid-Open No. 106788/1988 is characterized in that the grouped gate lines or the grouped drain lines are equipped alternately for every two adjacent lines with diodes and short-circuiting lines, and the diodes and the short-circuiting lines are etched off after cutting, surface treatment or the work of joining other parts.

The means disclosed in Japanese Patent Laid-Open No. 220289/1988 is characterized in that the grouped gate lines and the grouped drain lines are connected at their end portions with a reference potential line through two-terminal active elements, and the static electricity having invaded is dispersed by the actions of the two-terminal active elements and the reference potential line.

However, these prior arts have a drawback that the impedance elements and the short-circuiting lines, or the two-terminal active elements and the reference potential line have to be provided in addition to the wiring lines of the gate lines and the drain lines, and involve a problem that a step of etching off the diodes and the short-circuiting lines is additionally required.

It is, therefore, an object of the invention is to provide a liquid crystal display device against which counter-measures are taken for static electricity from the step of forming wiring lines of a substrate on the side where thin film transistors or switching elements are mounted to the step of completing module mounting and which is suited for improving the productivity and for lowering the production cost.

In connection with the flip-chip liquid crystal display device, a senior application for a patent of a module mounting process has been filed (Japanese Patent Application No. 256426/1994) by the present Applicant.

DISCLOSURE OF THE INVENTION

In order to achieve the above-specified object, according to the invention, there is provided a liquid crystal display device having an active matrix liquid crystal display element where a plurality of gate lines and a plurality of drain lines intersecting the gate lines through an insulating film are juxtaposed to each other over the face, opposed to a liquid crystal layer, of a first one of two transparent insulating substrates overlapping through the liquid crystal layer, and a switching element is disposed in the vicinity of each of the intersections between said gate lines and said drain lines, the liquid crystal display device being characterized in that resistor elements for connecting the gate lines or the drain lines are disposed inside a seal and arranged in one or more lines outside an effective pixel region.

The liquid crystal display device is further characterized in that resistor elements for connecting said gate lines or said drain lines are arranged outside the seal in addition to said resistor elements inside the seal.

The liquid crystal display device is further characterized in that the distance between two conductor electrodes constituting the resistor elements inside the seal and between the drain lines is substantially equal to the minimum size of the channel portions of thin film transistors constituting an effective pixel region.

Alternatively, the liquid crystal display device is characterized in that said resistor elements is constructed to include a semiconductor film having a photoconductivity.

Alternatively, the liquid crystal display device is characterized in that additional gate lines and additional pixels are arranged in a plurality of lines outside the first gate line or the last gate line in an effective pixel region, and the additional gate lines are short-circuited with each other at their end portions.

Alternatively, there is provided a liquid crystal display device having an active matrix liquid crystal display element of flip-chip type. The liquid crystal display device is characterized in that resistor elements for connecting drain lines on one substrate are inside a seal, extended in a direction X to the outside of an effective pixel region, and arranged in one or more lines, and resistor elements are outside the seal and also arranged between the wiring lines of gate lines on the output side of drive ICs mounted on the face of the same substrate, and between the drain lines.

Moreover, the liquid crystal display device is further characterized in that additional gate lines and additional pixels are arranged in a plurality of lines outside the first gate line or the last gate line in an effective pixel region, and the additional gate lines are short-circuited with each other at their end portions.

BRIEF DESCRIPTION OF THE DRAWINGS

FIG. 11A is a top plan view showing an example of an output wiring line on the drain side, and FIG. 11B is a section taken along line F—F of FIG. 11A;

FIG. 27 is a perspective view of a notebook personal computer or a word processor having a liquid crystal display module packaged therein.

BEST MODE FOR CARRYING OUT THE INVENTION

The invention will be described in detail in connection with its embodiments with reference to the accompanying drawings.

<<Planar and Section Construction near Drive IC Chip Mounting Region>>

Figure 6:
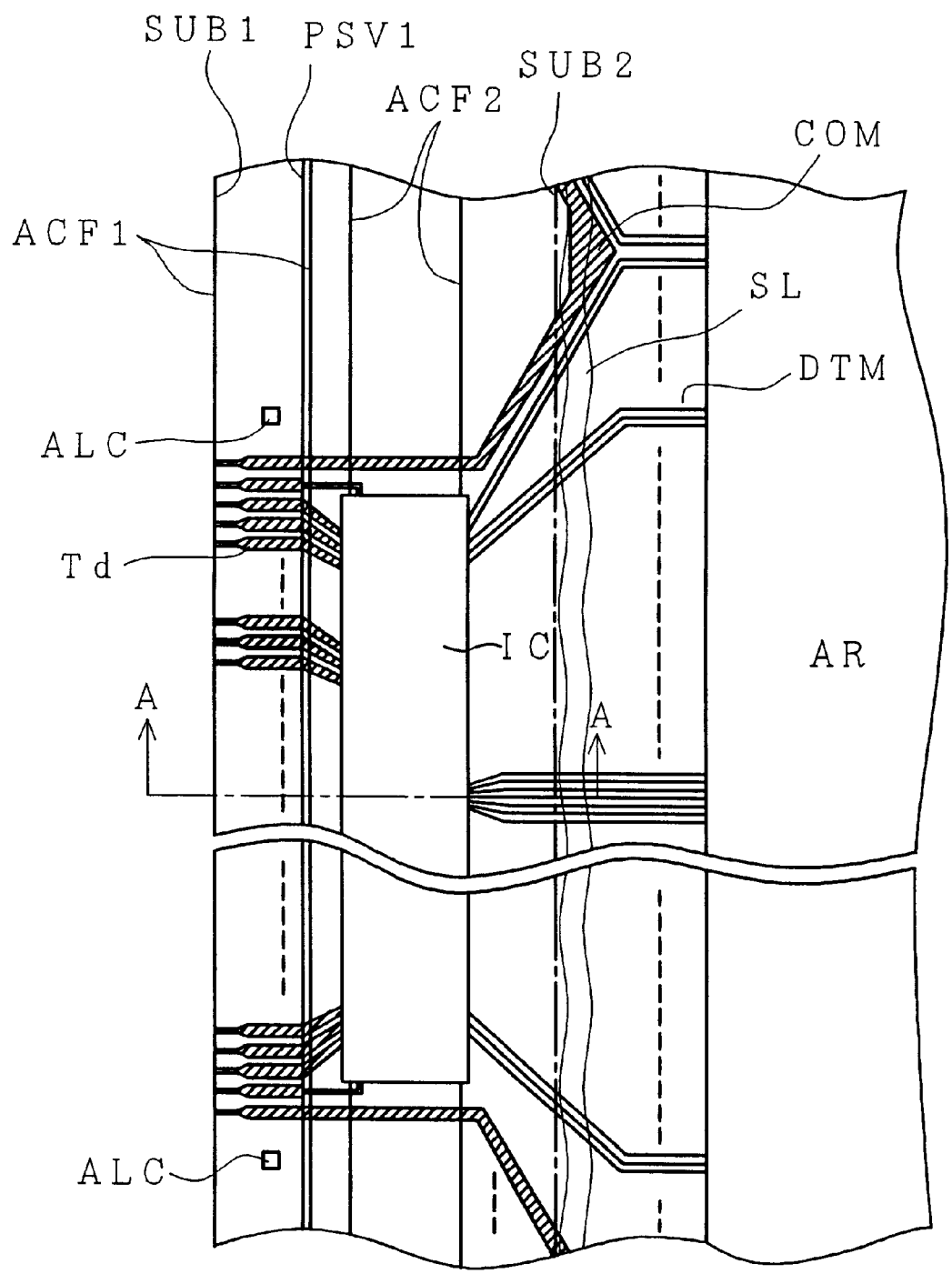
FIG. 6 is a top plan view showing the state that the drive ICs are mounted on the substrate SUB1 of a liquid crystal display element according to the invention.
Figure 17:
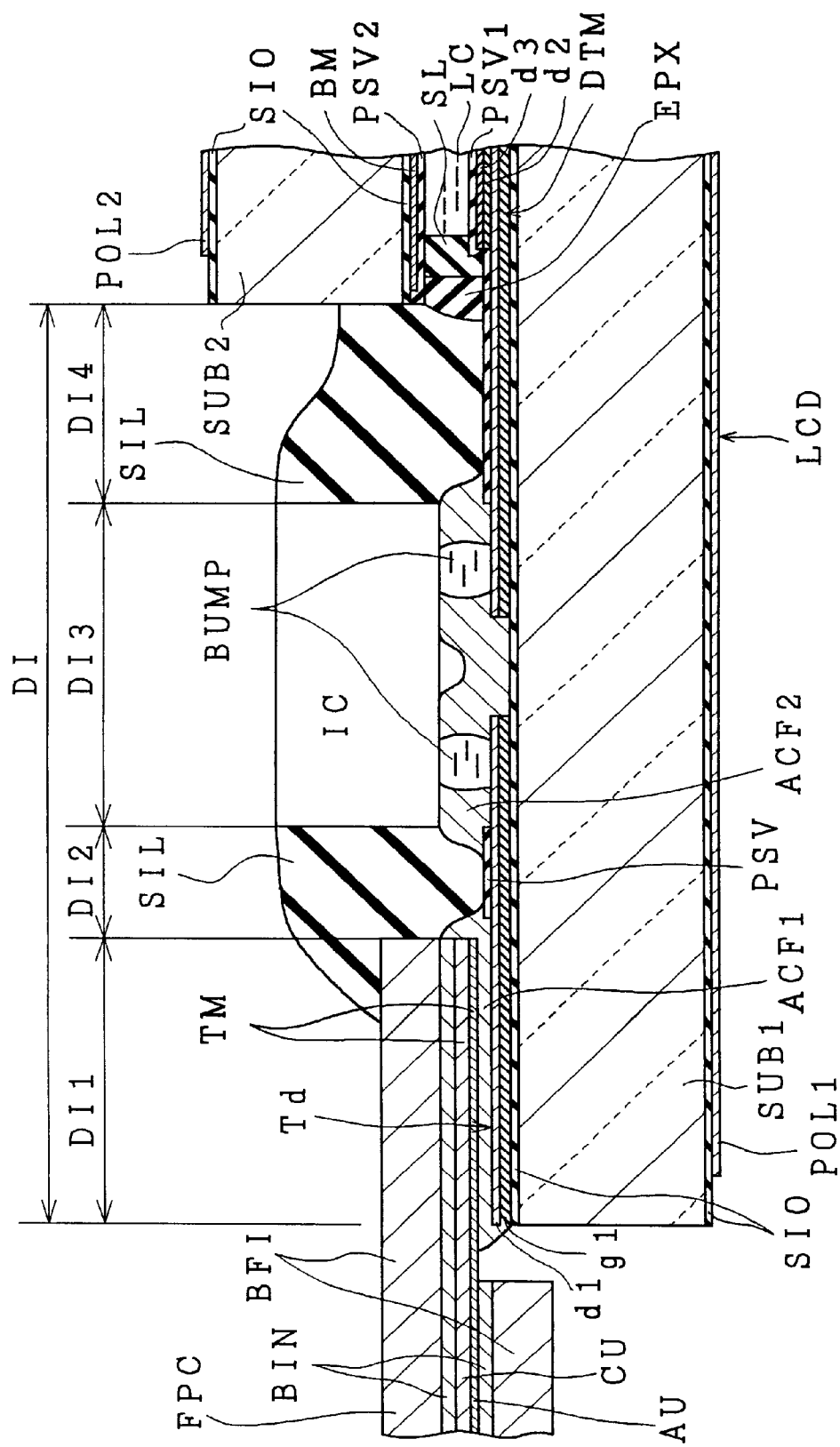
FIG. 17 is a section taken along line A—A of FIG. 6.

FIG. 6 is a top plan view showing the state that drive ICs are mounted on a transparent insulating substrate SUB1 made of glass, for example. A section along line A—A is shown in FIG. 17. Another transparent insulating substrate SUB2 is positioned, as shown by a single-dot and dash line over the transparent insulating substrate SUB1, and a liquid crystal LC including an effective display region (or an effective screen area) is sealed in with a seal pattern SL (see FIG. 6). An electrode COM over the transparent insulating substrate SUB1 is electrically connected through conductive beads or silver paste with the common electrode pattern on the transparent insulating substrate SUB2 side. A wiring DTM (or GTM) transmits an output signal from the drive IC to the wiring in the effective display region AR. An input wiring Td transmits an input signal to the drive IC. As for an anisotropic conductive film ACF, there are joined a slender film ACF2 common to a plurality of drive IC regions arranged in line, and a slender film ACF1 common to the input wiring pattern regions to the drive IC regions. Passivation films (protective films) PSV1 and PSV, as also shown in FIG. 17, are formed to cover the wiring regions as wide as possible for preventing electrolyte corrosion, whereas the exposed regions are covered with the anisotropic conductive film ACF1.

The sides and peripheries of the drive IC are filled with a silicone resin SIL (see FIG. 17) thereby to effect multiplex protection.

<<Liquid Crystal Display Element and Circuits Arranged Therearound>>

Figure 23:
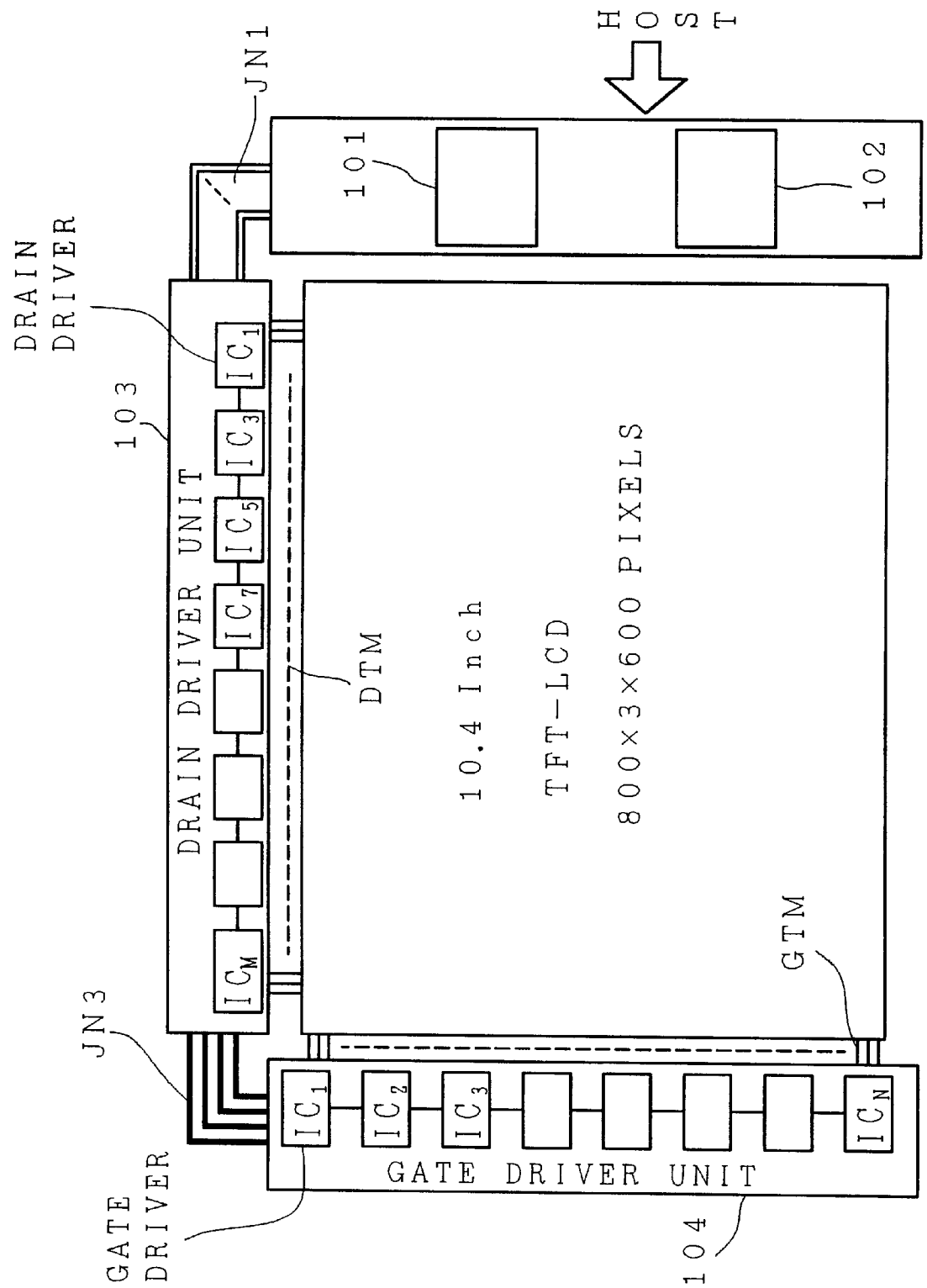
FIG. 23 is a block diagram showing a liquid crystal display panel and circuits arranged in the periphery of the panel.

FIG. 23 is a block diagram showing a TFT liquid crystal display element of an active matrix TFT liquid crystal display module using thin film transistors TFT as switching elements, and circuits arranged around the TFT liquid crystal display module. In this embodiment, drain drivers IC1 to ICM and gate drivers IC1 to ICN formed on one side of the liquid crystal display element are chip-on-glass (COG) packaged, as shown in FIG. 17, using the drain side lead-out lines DTM and the gate side lead-out lines GTM formed over one transparent insulating substrate SUB1 of the liquid crystal display element, and the anisotropic conductive film ACF2, or using an ultraviolet setting resin SIL. This embodiment is applied to a liquid crystal display element having effective dots of 800×3×600 conforming to the XGA specifications. As a result, ten (M=10) drain drivers ICs having 240 outputs are COG-packaged and six (N=6) gate driver ICs having 101 outputs are COG-packaged at the long side and at the short side, respectively, over the transparent insulating substrate of the liquid crystal display element. Considering the number of pixels, totally six hundreds outputs of the gate driver are sufficient. In order to form additional gate lines over and below the effective pixel region, however, the structure is made to have 101 outputs in the uppermost region, 100×4 outputs in the central region and 101 outputs in the lowermost region, as will be described hereinafter. Here, 100 and 101 outputs can be selectively used by using the same gate driver IC.

A drain driver unit 103 is disposed on the upper side of the liquid crystal display element; a gate driver unit 104 is disposed on one lateral side; and a controller unit 101 and a power supply 102 are arranged on the other lateral side. These controller unit 101 and power supply 102, the drain driver unit 103 and the gate driver unit 104 are interconnected through electrical connection means JN1 and JN3.

In the embodiment, a TFT liquid crystal display module having a screen size of 10.4 inches and 800×3×600 dots is designed as a XGA panel. As a result, the size of each dot of red (R), green (G) and blue (B) colors is 264 microns (the gate line pitch)×88 microns (the drain line pitch), and one pixel is a combination of 3 dots of red (R), green (B) and blue (B) colors and is 264 microns square. For the drain line lead-out wiring lines DTM of 800×3, therefore, the lead line pitch is not more than 100 microns, i.e., not more than the connection pitch limit for the tape carrier package (TCP) that is available at present. In the COG packaging, the minimum that can be used at present is about 70 microns for the pitch of a bump region BUMP of the drive IC chip and about 40 microns square for the area of the intersection with the underlying wiring lines, although it depends upon the material used for the anisotropic conductive film or the like. In the embodiment, therefore, the drain driver ICs are arranged in line on one long side of the liquid crystal panel, the drain lines are led to the lower side, and the pitch of the drain line lead wiring lines DTM is determined to be 88 microns. As a result, the bump region BUMP pitch (see FIG. 17) of the drive IC chip can be designed to be about 70 microns, and the cross area with the underlying wiring lines can be designed to be about 40 microns square, so that the drive IC chip can be highly reliably connected with the underlying wiring lines. The gate line pitch is as large as 264 microns, and hence the gate lead lines GTM are led out from one short side. For the high definition, however, the gate lead lines GTM can be alternately led out from the opposed two short sides, similarly to the drain lines. For the structure in which the drain lines or the gate lines are alternately led out, however, it is easy to connect the lead wiring lines DTM or GTM and the output side BUMP of the drive ICs, but it is necessary to arrange the peripheral circuit substrates at the outer peripheries of the two opposed long sides of a liquid crystal panel PNL. This necessity raises a problem that the external size is larger than that of the one-side leads.

As the number of display colors increases, the number of data lines of the display data increases, enlarging the outermost shape of the data processor. In this embodiment, therefore, the problem of the prior art is solved by using a multi-layered flexible substrate.

The drive IC adopted in the embodiment is given an extremely slender shape so as to minimize the external shape of the module, as roughly shown in FIG. 6. In the gate drive IC, for example, the long sides have a size of about 11 to 17 mm whereas the short sides have a size of about 1.0 to 1.5 mm. In the drain drive IC, the long sides have a size of about 11 to 20 mm whereas the short sides have a size of about 1.0 to 2.0 mm. In the embodiment, moreover, the gate output wiring pattern GTM between the effective display region AR and the output side bump region BUMP of the drive IC extends in three directions of the long sides and the short side of the drive IC. The drain output wiring pattern GTM extends in one direction of the long side of the drive IC.

In the embodiment, for example, twenty one of the 101 outputs are wired from the two short sides, and the remaining eighty are wired from one long side, in the gate side drive IC. The drain side drive IC is designed into a slender shape having output wiring lines only in the long side direction, so that 240 outputs are wired from the one long side.

Figure 25:
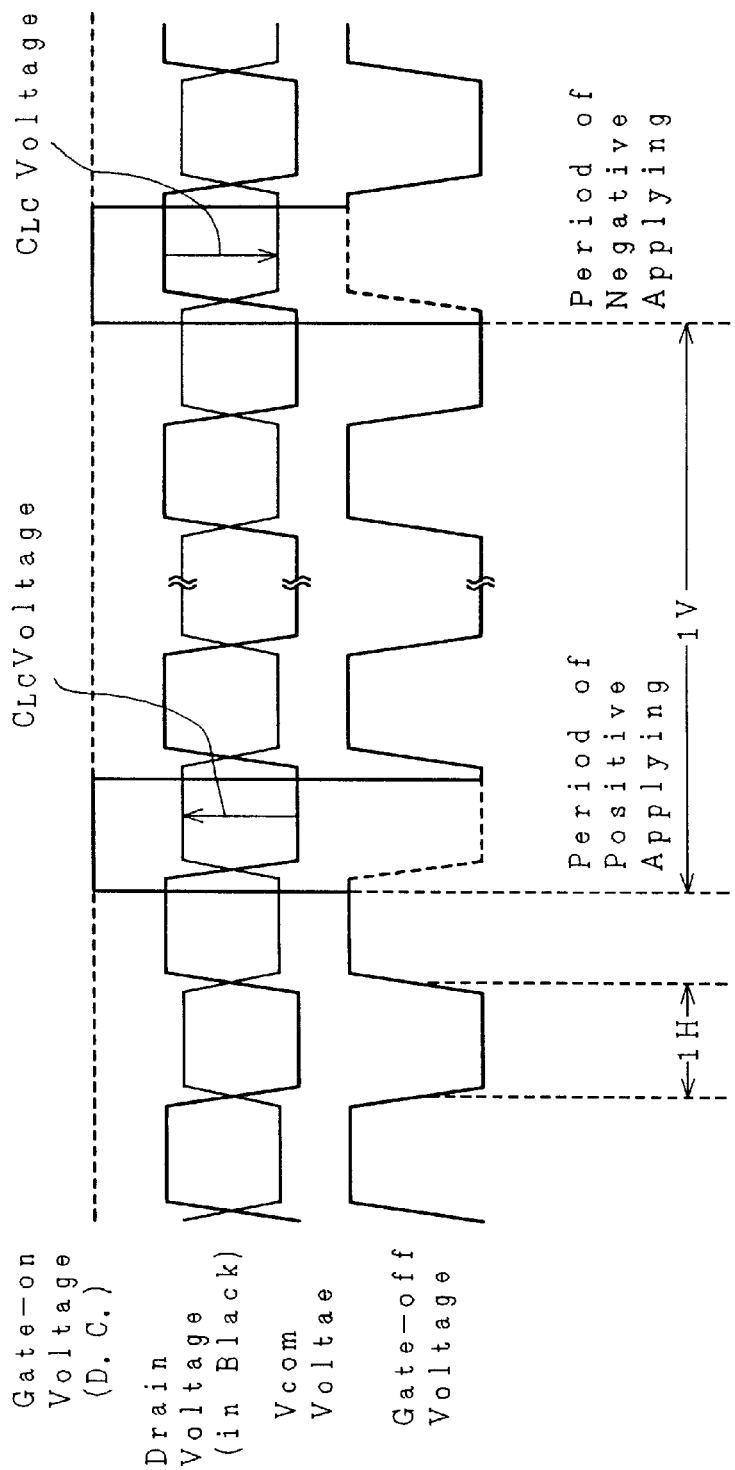
FIG. 25 is a diagram showing the levels and waveforms of a common voltage applied to the common electrode, a drain voltage applied to the drain electrodes and a gate voltage applied to the gate electrodes in a liquid crystal display module.

FIG. 25 shows the levels and waveforms of a common voltage applied to the common electrode, a drain voltage applied to the drain electrodes, and a gate voltage applied to the gate electrodes. Here, the drain waveforms are those when displaying the black color.

For example, the gate-on level waveform (DC current) and the gate-off waveform change between –0 to –14 V, and the gates are turned on at 10 V. The drain waveform (when the black coloris displayed) and the waveform of the common voltage Vcom change in their levels between 0 to 3 V. In order to change the drain waveform at the black level for each horizontal period (1 H), for example, the logic inversion of 1 bit is executed in the logic processor and inputted to the drain driver. The off-level waveform of the gates is operated in substantially the same amplitude and phase as those of the Vcom waveform.

Figure 24:
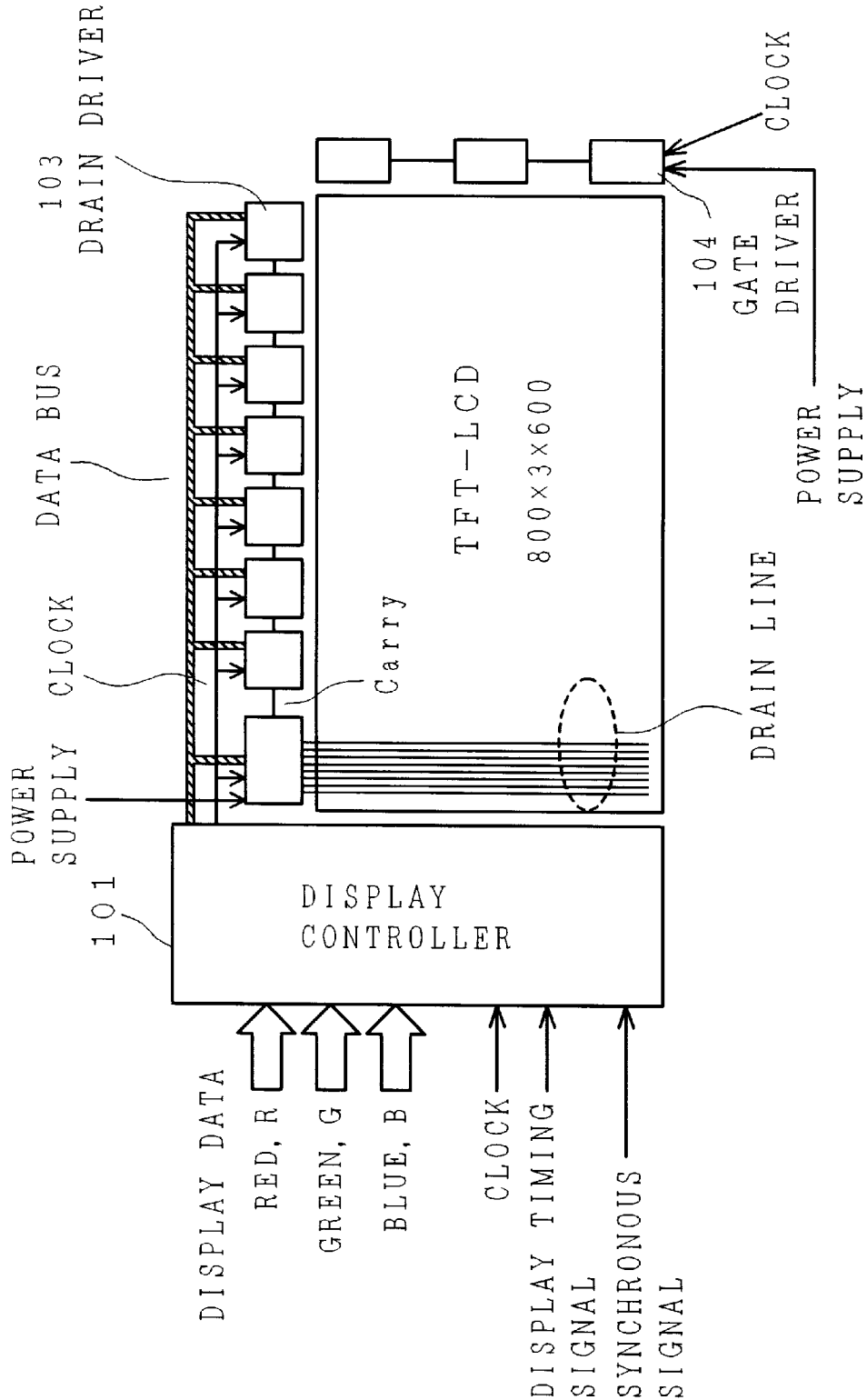
FIG. 24 is a diagram showing flows of display data and clock signals from a display controller to gates and a drain driver.

FIG. 24 is a diagram showing flows of the display data and the clock signal to the gate driver 104 and the drain driver 103 in the TFT liquid crystal display module of the embodiment.

Upon receiving to the control signals (including the clock, the display timing signal and the synchronous signal) from a host computer, the display controller 101 generates not only a clock D1 (CL1), a shift clock D2 (CL2) and display data as the control signals to the drain driver 103 but also a frame start instruction signal FLM, a clock G (CL3) and display data as the control signals to the gate driver 104.

Moreover, the front stage carry output of the drain driver 103 is inputted as it is to the carry input of the next stage drain driver 103.

<<Method of Fabricating Transparent Insulating Substrate SUB1 >>

Next, the method of fabricating the first transparent insulating substrate SUB1 of the aforementioned liquid crystal display device will be described with reference to FIGS. 20 to 22. In these Figures, the words in the center are the abbreviated step names, and the lefthand and righthand parts show the flows of the steps, illustrating the pixel region, the gate terminal and its vicinity. Excepting the steps B and D, the steps A to G correspond to the photographic treatments, and the sections of the steps show the stages at which the photoresists are removed after the photographic treatments. Here, the photographic treatments are intended in this description to mean a series of processing steps from the application of the photoresist through the selective exposure a using mask to the development, and their repeated description will be omitted. The steps will be separately described in the following.

Step A: FIG. 20

A silicon oxide film SIO is formed by a dipping method on the two sides of the first transparent insulating substrate SUB1 made of 7059 glass (trade name) and is baked at 500° C. Here, this SIO film is formed to smooth the surface of the transparent insulating substrate SUB1 but can be omitted if the substrate SUB1 has a smooth surface. A first conductive film gl having a thickness of 2,800 angstroms and made of Al—Ta, Al—Ti—Ta or Al—Pd is formed by sputtering. After this photography, the first conductive film g1 is selectively etched with a mixed acid solution of phosphoric acid, nitric acid and glacial acetic acid.

Step B: FIG. 20

Immediately after direct drawing of the resist (after the formation of the aforementioned anodic oxidation pattern), the substrate SUB1 is dipped in an anodic oxidation liquid, which is prepared by adjusting the acidity of 3% tartaric acid with ammonia to a pH value of 6.25±0.05 and diluting the adjusted liquid with ethylene glycol at a ratio of 1:9, so as to adjust the formation current density to 0.5 mA/cm2 (constant current formation). Anodic oxidation (anodic formation) is then executed till the formation voltage reaches 125 V high enough to achieve a predetermined thickness of the film A3l2O. After this, the substrate SUB1 is desirably held in this state for several tens minutes (constant voltage formation). This is important for achieving a uniform Al2O3. oxidized film AOF having a thickness of 1,800 angstroms in a self-alignment way over scanning signal lines (gate lines) GL and on their sides, serving as a part of the gate insulating film of the thin film transistor TFT.

Step C: FIG. 20

A conductive film do of an ITO film having a thickness of 1,400 angstroms is formed by sputtering. After the photography treatment, the conductive film d1 is selectively etched with a mixed acid solution of hydrochloric acid and nitric acid as the etching liquid to form the uppermost layer of the gate terminal GTM and the drain terminal DTM and a transparent pixel electrode ITO1.

Step D: FIG. 21

An ammonia gas, a silane gas and a nitrogen gas are introduced into a plasma CVD apparatus to form a silicon nitride film having a thickness of 2,000 angstroms, and a silane gas and a hydrogen gas are introduced into the plasma CVD apparatus to form an i-type amorphous Si film having a thickness of 2,000 angstroms. After this, a hydrogen gas and a phosphine gas are introduced into the plasma CVD apparatus to form an $N^+$-type amorphous Si film d0 having a thickness of 300 angstroms. These filming steps are successively executed by changing the reaction chambers of the same CVD apparatus.

Step E: FIG. 21

After this photographic treatment, SF6 and BC1 are employed as the dry etching gas to etch the $N^+$-type amorphous Si film d0 and an i-type amorphous Si film AS. Subsequently, SF6 gas is employed to etch a silicon nitride film GI. It is quite natural that the $N^+$-type amorphous Si film d0, the i-type amorphous Si film AS and the silicon nitride film GI are successively etched with the SF6 gas.

Thus, the manufacturing process of the embodiment is characterized by the successive etching of the three-layered CVD film with the gas which is composed mainly of the SF6. More specifically, the etching rates with the SF6 gas are higher for the $N^+$-type amorphous Si film d0, the i-type amorphous Si film AS and the silicon nitride film GI in this order. When the etching of the $N^+$-type amorphous Si film do is ended and the etching of the i-type amorphous Si film AS is started, the overlying $N^+$-type amorphous Si film d0 is side-etched and the i-type amorphous Si film AS is tapered at about 70 degrees. When the etching of the i-type amorphous Si film AS is ended and the etching of the silicon nitride film GI is started, the overlying $N^+$-type amorphous Si film d0 and i-type amorphous Si film AS are side-etched in this order and the i-type amorphous film AS is tapered at about 50 degrees whereas the silicon nitride film GI is tapered at 20 degrees. These tapered shapes reduce the probability of open circuits drastically even when a source electrode SD1 is formed thereover. The $N^+$-type amorphous Si film d0 has a taper angle of approximately 90 degrees but has a thickness of as small as 300 angstroms, so that the disconnection probability at this step is remarkably low. As a result, the planar patterns of the $N^+$-type amorphous Si film d0, the i-type amorphous Si film AS and the silicon nitride film GI are not strictly the same but have normally tapered sections, so that they have larger patterns in this order.

Step F: FIG. 22

A second conductive film d2 made of Cr having a thickness of 600 angstroms is formed by sputtering, and a third conductive film d3 made of Al—Pd, Al—Si or Al—Ti—Ta having a thickness of about 4,000 angstroms is also formed by sputtering. After the photography treatment, the third conductive film d3 is etched with a liquid similar to that of Step A, and the second conductive film d2 is etched with an solution of ammonium cerium nitrate to form a video signal line DL, a source electrode SD1 and a drain electrode SD2.

Here in the embodiment, the $N^+$-type amorphous Si film d0, the i-type amorphous Si film AS and the silicon nitride film GI are normally tapered, as described at step E, so that they can be formed only of the second conductive film d2 in the liquid crystal display device having a high resistance allowance of the video signal line DL.

Next, the $N^+$-type semiconductor layer d0 between the source and the drain is selectively removed by introducing SF6 and BCl into the dry etching apparatus to etch the $N^+$-type amorphous Si film d0.

Step G: FIG. 22

An ammonia gas, a silane gas and a nitrogen gas are introduced into the plasma CVD apparatus to form a silicon nitride film having a thickness of 0.6 microns. After the photography treatment, the SF6 is employed as the dry etching gas to form the passivation film PSV 1. This passivation film can be not only the SiN film formed by the CVD method but also a film made of an organic material.

<<One Pixel of Liquid Crystal Display Panel and its Periphery>>

Figure 19:
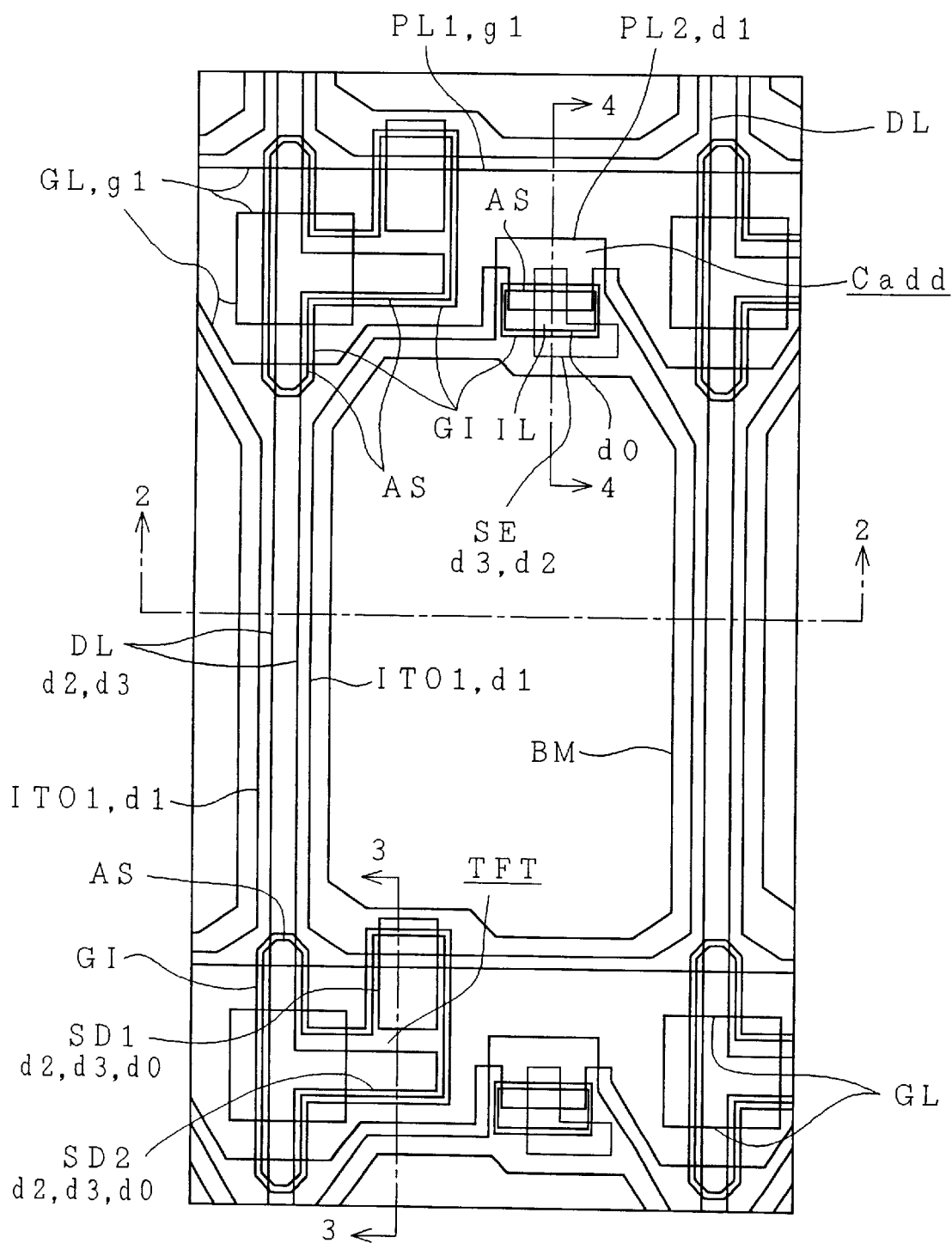
FIG. 19 is a top plan view showing an example of pixel regions P1 and P2 of FIGS. 1 and 2.
Figure 20:
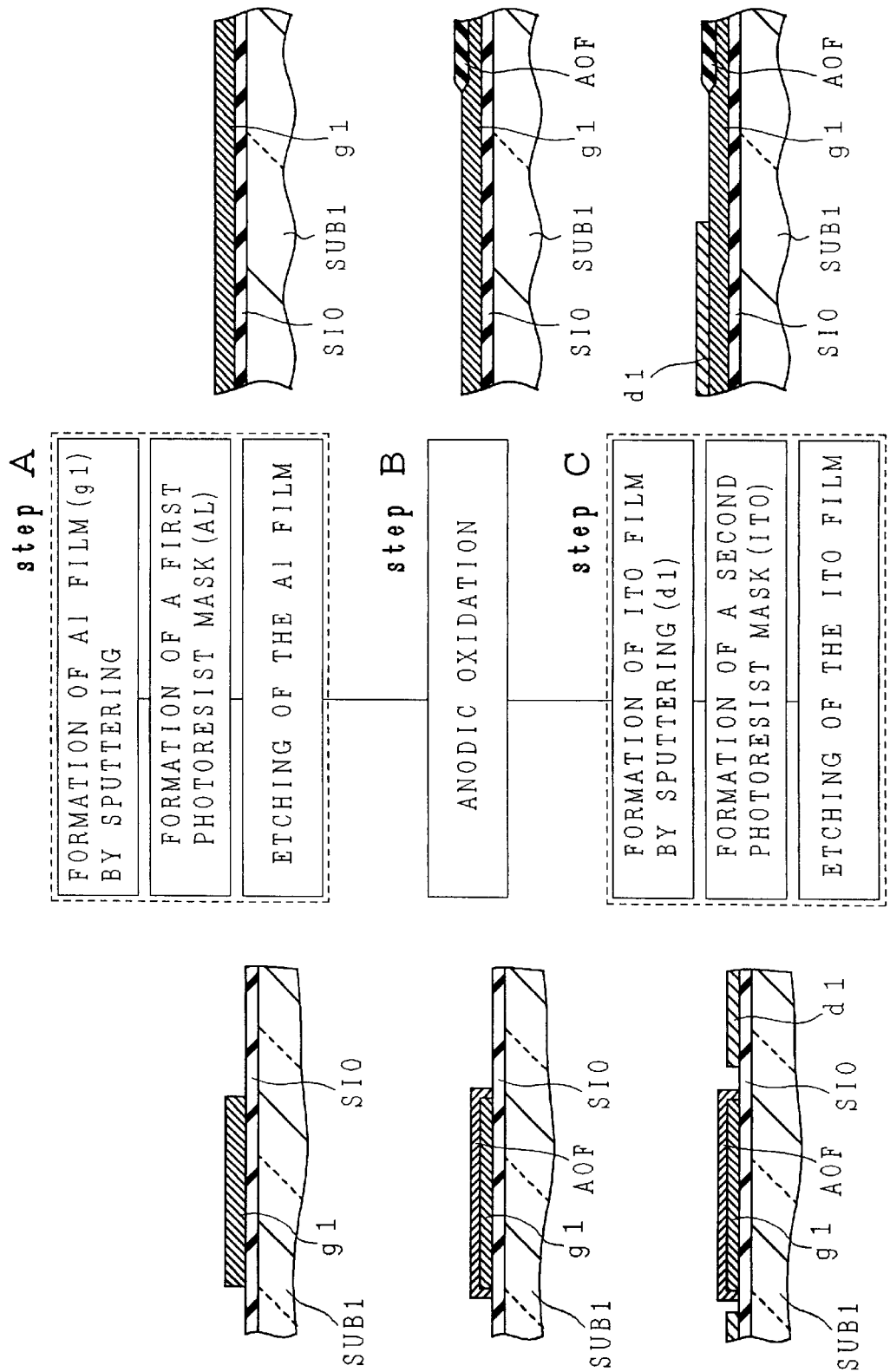
FIG. 20 shows a flowchart illustrating steps A to C of preparing the substrate SUB1 side, and shows sections of the pixel region and the gate terminal region.
Figure 21:
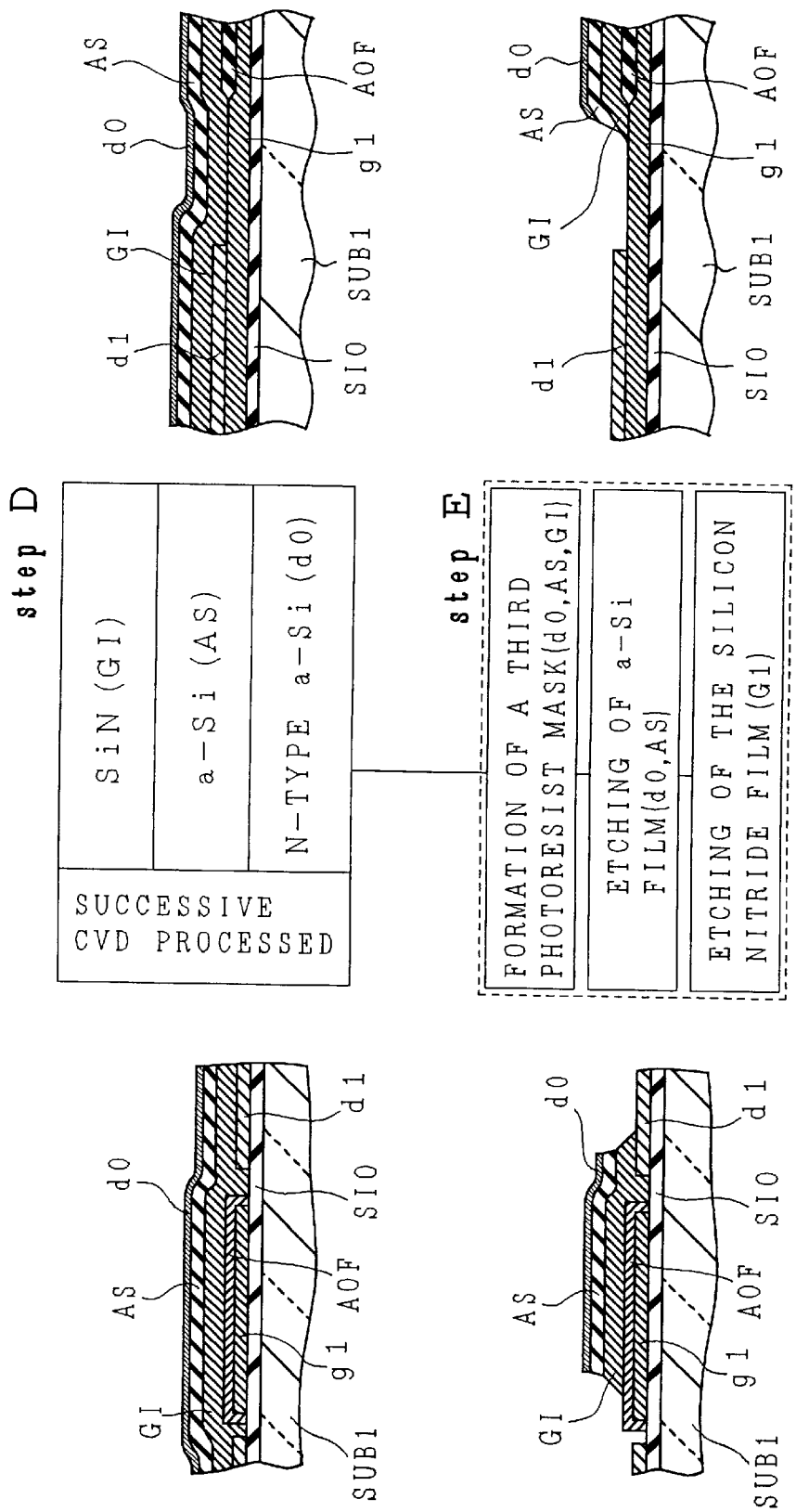
FIG. 21 shows a flowchart illustrating steps D to E of preparing the substrate SUB1 side, and shows sections of the pixel region and the gate terminal region.
Figure 22:
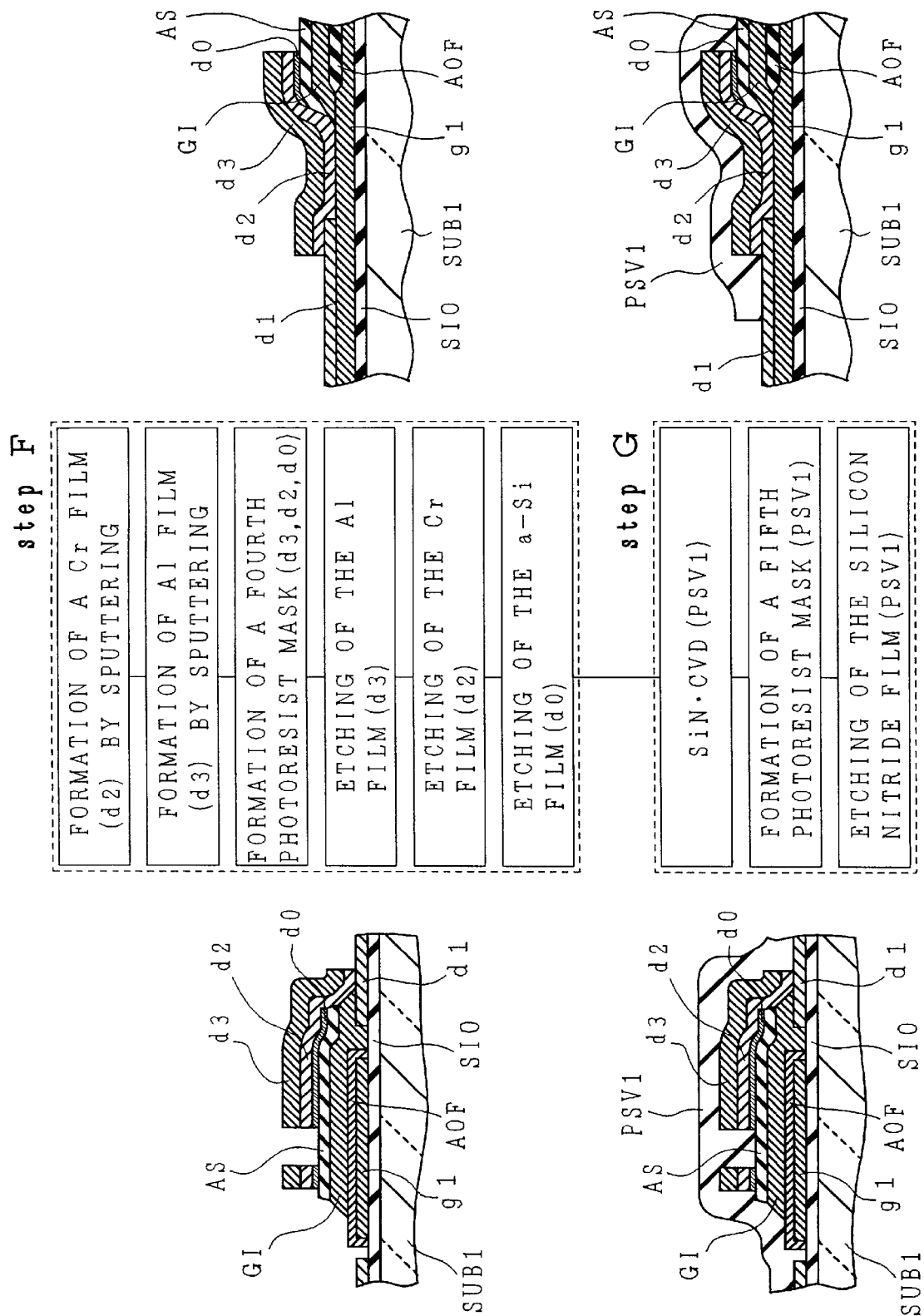
FIG. 22 shows a flowchart illustrating steps F and G of preparing the substrate SUB1 side, and shows sections of the pixel region and the gate terminal region.

FIG. 19 shows one pixel and its periphery of the liquid crystal display panel, which is manufactured by the process shown in FIGS. 20 to 22.

Each pixel is disposed in an intersecting region (a region enclosed by four signal lines) between two adjacent scanning lines (the gate lines or horizontal signal lines) GL and two adjacent video signal lines (the data lines, drain lines or vertical signal lines) DL. Each pixel includes a thin film transistor TFT, a transparent pixel electrode ITO1 and a holding capacitance element (an additional capacitance element) Cadd. The scanning signal line GL is bifurcated in the vicinity of the intersection with the video signal line DL. This is because one of these two branch lines is cut, if short-circuited to the video signal line DL, so that the other (uncut) line may be used for the normal operation, preventing the line defect.

<<Entire Structure of Transparent Insulating Substrate SUB1 against Which Counter-Measures are taken for Static Electricity>>

Figure 4:
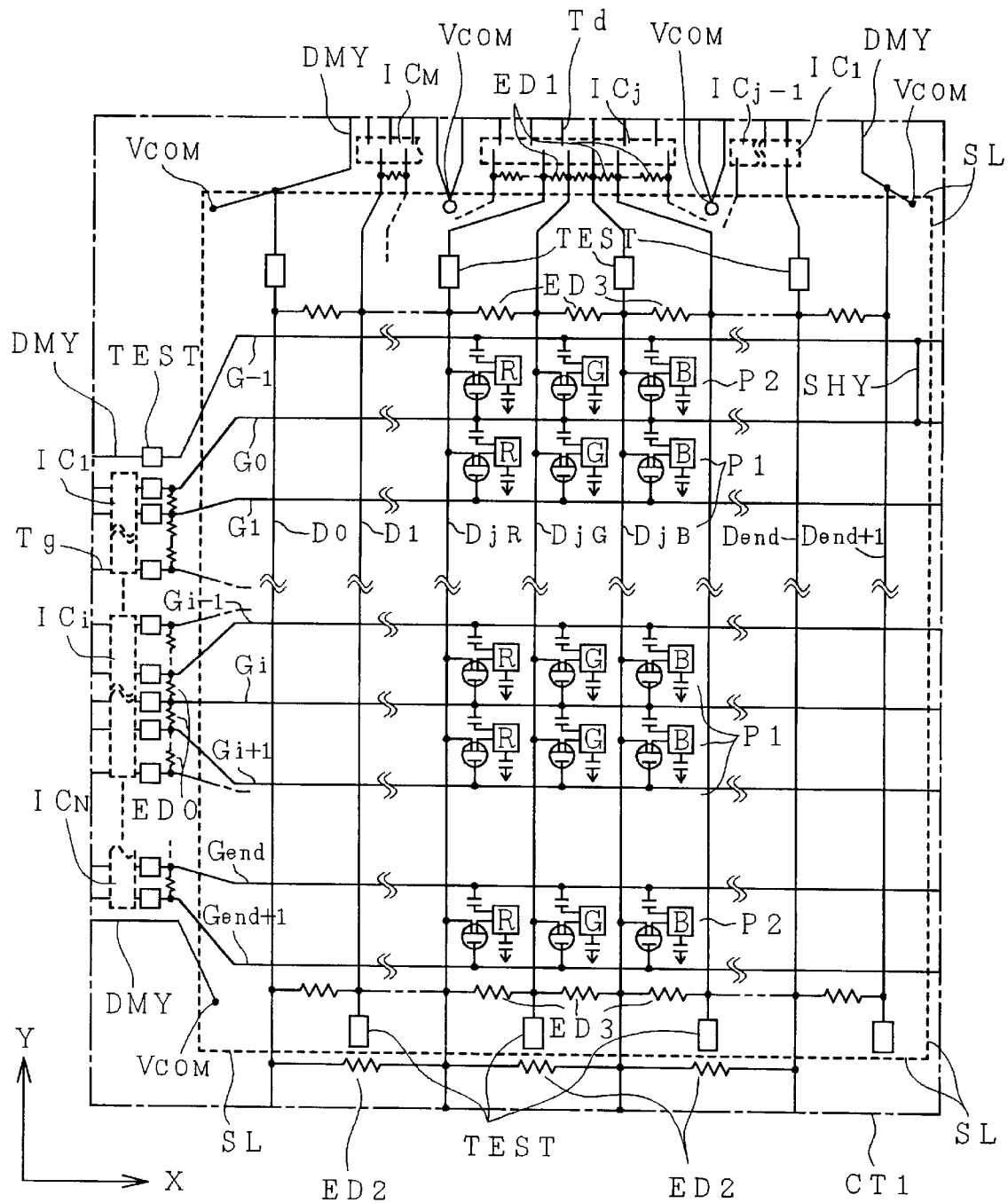
FIG. 4 shows the entire modeled circuit structure of a substrate SUB1 on the active matrix side after cut of the liquid crystal display device according to the invention, illustrating relations among an effective pixel region of the matrix, electrostatic counter-measure patterns ED0, ED1, ED2 and ED3, additional gate lines G-1, G0 to Gend+1, additional drain lines D0 to Dend+1, and drive IC mounting regions at a peripheral part.
Figure 5:
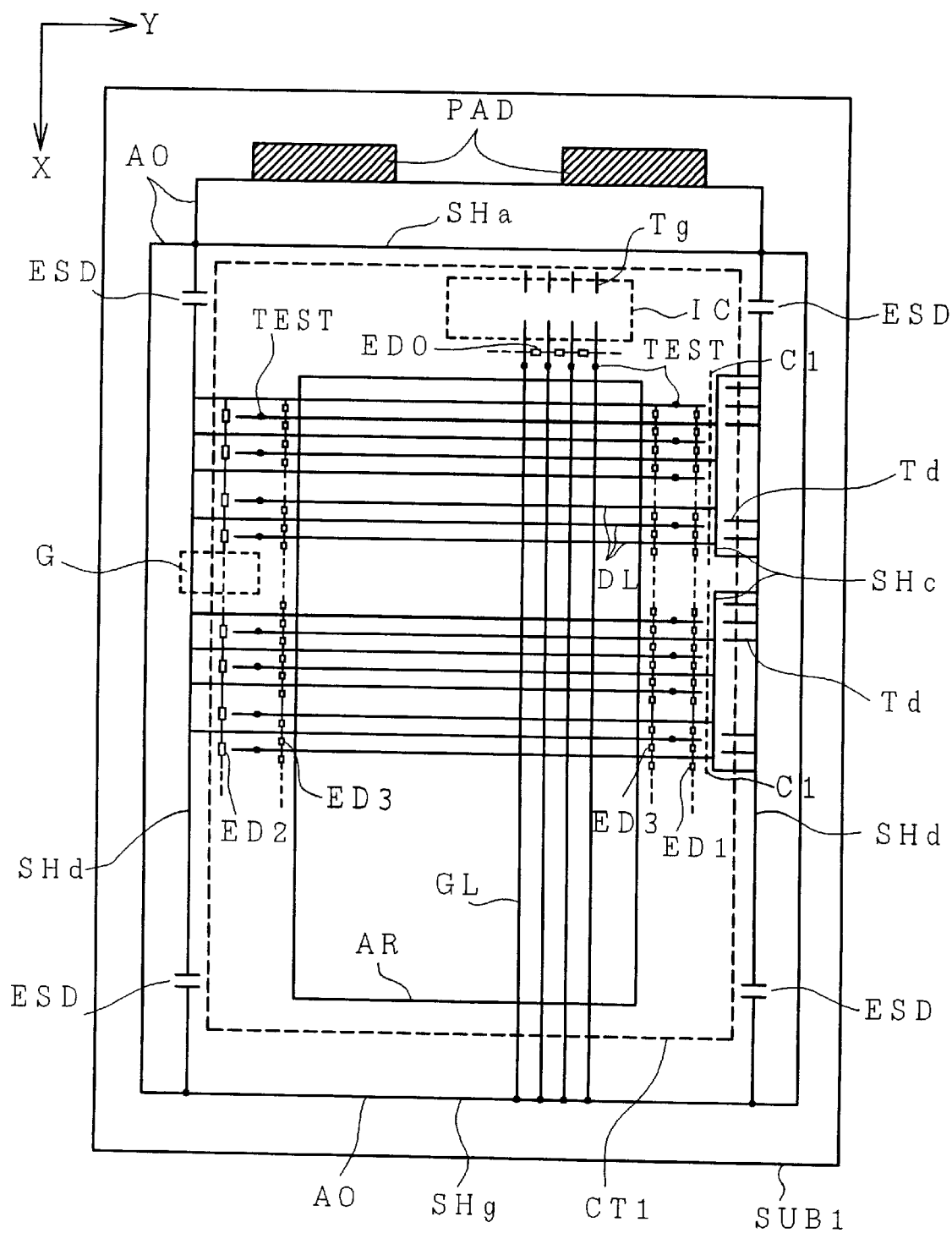
FIG. 5 is a top plan view of the entirety of a substrate SUB1 on the active matrix side in a surface processing before cut along a cutting line CT1.

FIG. 5 is a top plan view of the entire of the transparent insulating substrate SUB1 in the procedure of a surface treatment before it is cut along a cutting line CT1. FIG. 4 is a diagram of the entire circuit in which the transparent insulating substrate SUB1 cut along the cutting line CT1 is modeled.

Before the cutting, as shown in FIG. 5, short-circuiting lines SH*g*, SH*d* and SH*a* are formed for the electrostatic counter-measures in the outer peripheries of the group of gate lines and the group of drain lines and are capacitively coupled through capacitors ESD. Other short-circuiting lines SH*c* are formed in the mounting portion below the drive IC. These short-circuiting lines are effective in preventing the terminal breakage caused by electrostatic sparks, and the structure will be described in detail later. The short-circuiting lines SH*g*, SH*d* and SH*a* are disposed outside the cutting line CT1 and removed after the cutting of the substrate, so that they are ineffective as the electrostatic counter-measures. Moreover, the short-circuiting lines SH*c* are also cut by the laser beam before the drive lCs are mounted on the substrate SUB1. These short-circuiting lines insufficient as the electrostatic counter-measures after the substrate is cut. Especially, at the time of thermally bonding the TCP parts or at the time of adhering rubber cushions of the module part packaging step after the completion of the liquid crystal display cell having two opposed substrates joined to each other, or at the time of mounting the drive semiconductor IC chip of the flip-chip packaging step, static electricity is produced and it invades from the terminal region of the substrate on the thin film transistors side of the liquid crystal display cell, thereby causing defect.

According to the invention, therefore, defect is prevented by forming the resistor elements inside and outside the seals and between the gate terminals GTM or the drain terminals DTM, by providing the additional gate lines and the additional pixels to the outside of the initial or final stage gate to short-circuit the end portions of the additional gate lines.

FIG. 4 shows the circuit structure of the active matrix substrate SUB1 of flip-chip type of one embodiment according to the invention.

Resistor elements ED3 are so formed inside the region of the seal SL as to extend in a direction X between the drain terminals DTM, and resistor elements ED0, ED1 and ED2 are formed outside the region of the seal SL between the gate terminals GTM or the drain terminals DTM for the electrostatic counter-measure.

In addition to the group of gate lines G1 to Gend constituting the effective pixel region, moreover, there are formed additional gate lines G-1 and G0 and additional gate lines Gend+1 outside the initial stage gate lines and outside the final stage gate lines, respectively. These additional gate lines are formed simultaneously with the formation of the gate lines in the effective pixel region. To the additional gate lines G0, the gate line group G1 to Gend and the additional gate line Gend+l, moreover, there are applied from the gate scanning drive IC1 to ICN the output waveforms which are sequentially shifted for each horizontal period to turn on/off the thin film transistors. To the additional gate line G-1, there are further applied through the additional gate line G0 and a short-circuiting line SHY the aforementioned gate output waveforms for the electrostatic counter-measures.

Figure 16:
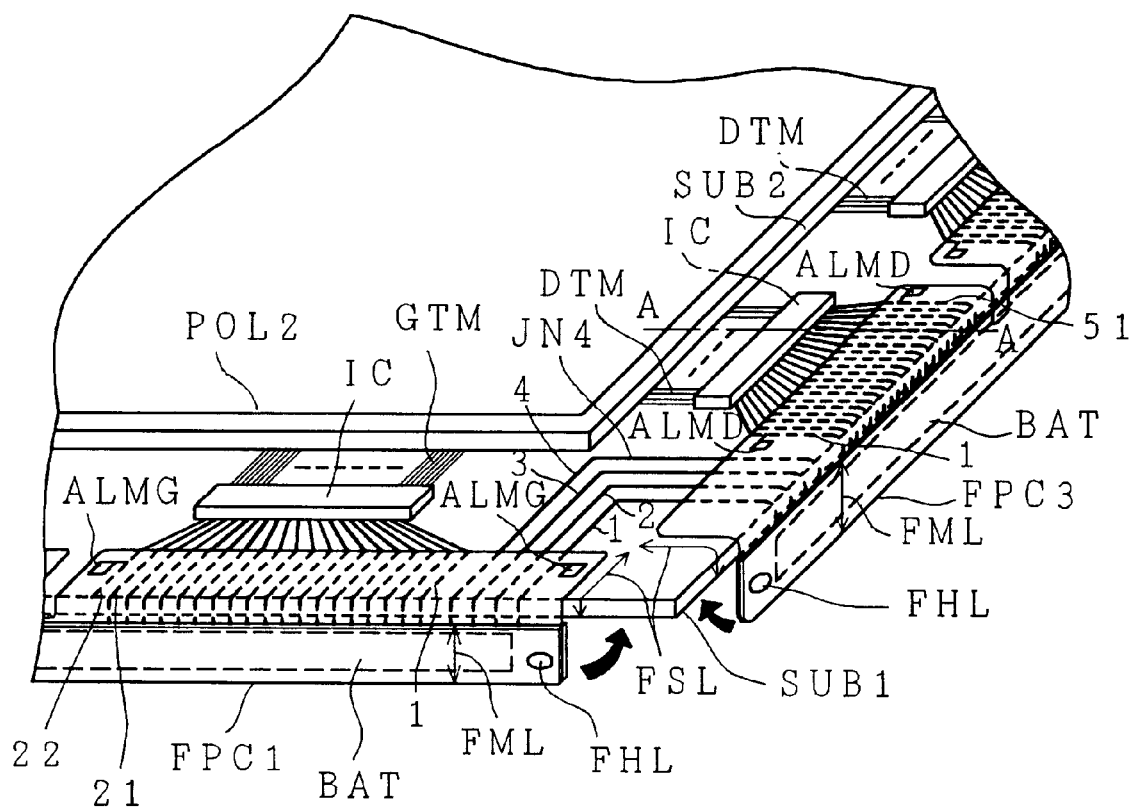
FIG. 16 is a perspective view showing a method of bending and packaging a bendable multi-layered flexible substrate FPC into the liquid crystal display element.

The additional drain lines D0 and Dend+1 are formed outside the initial stage drain line D1 and the final stage drain line Dend, respectively. These additional drain lines are formed simultaneously with the formation of the drain lines in the effective pixel region. To the drain line group D1 to Dend, there are applied the signal waveforms from the drain drivers IC1 to ICM. Moreover, the additional drain liens D0 to Dend+1 are extended in a direction Y and connected with the wiring line region from the common voltage feed terminal Vcom. At the region of a dummy terminal DMY, as shown in FIG. 16, a flexible substrate FPC is connected at a subsequent step and fed with the common voltage waveform. This common voltage is further applied to a plurality of common voltage feed terminals Vcom which are formed in the seal SL between the drain driver ICs and connected with the terminals, as shown in FIG. 4 and FIG. 6. On the gate scanning drive IC side, moreover, there is formed one common voltage feed terminal Vcom outside the additional gate line Gend+1. Even in the structure having the drain driver ICs arranged on one side, too, the uniform common voltage waveform with no distortion can be applied to the whole faces of the common electrodes by forming the common voltage feed terminals Vcom at a plurality of regions, i.e., at the three corners of the transparent substrate SUB1 and at regions between the drain driver ICs.

<<Electrostatic Counter-Measure by Resistor Elements ED3 between Gate terminals GTM or Drain Terminals DTM Inside Seal Region>>

Figure 1:
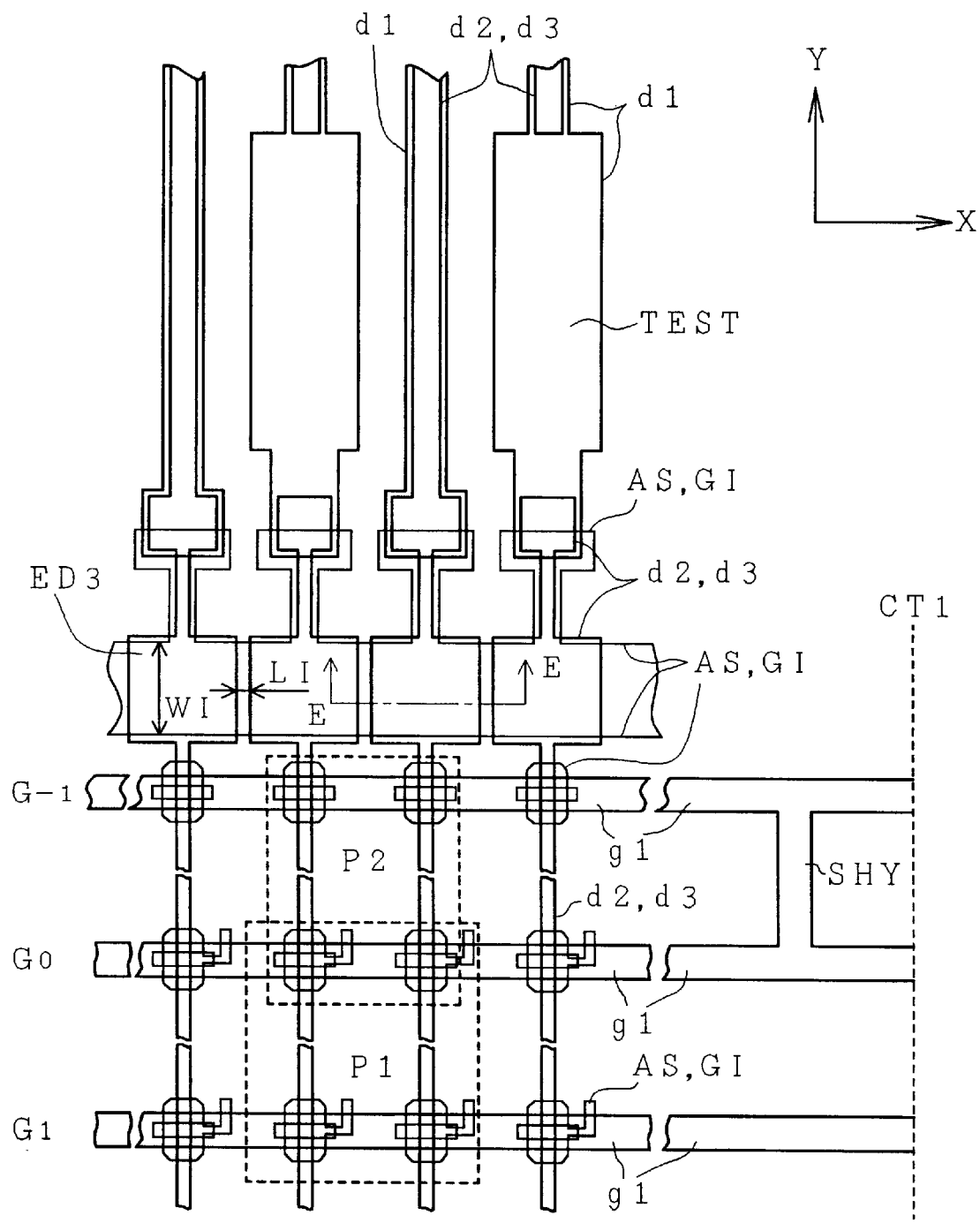
FIG. 1 is a top plan view showing resistor elements for counter-measures against static electricity additional gate lines and additional pixels of a liquid crystal display device according to the invention.

FIG. 1 shows one embodiment of the invention and is a top plan view of the first gate line G1 and its vicinity of the effective pixel region AR. The resistor element ED3 is extended in the direction X between a test terminal TEST of the drain terminal DTM and the additional gate line G-1.

Figure 2:
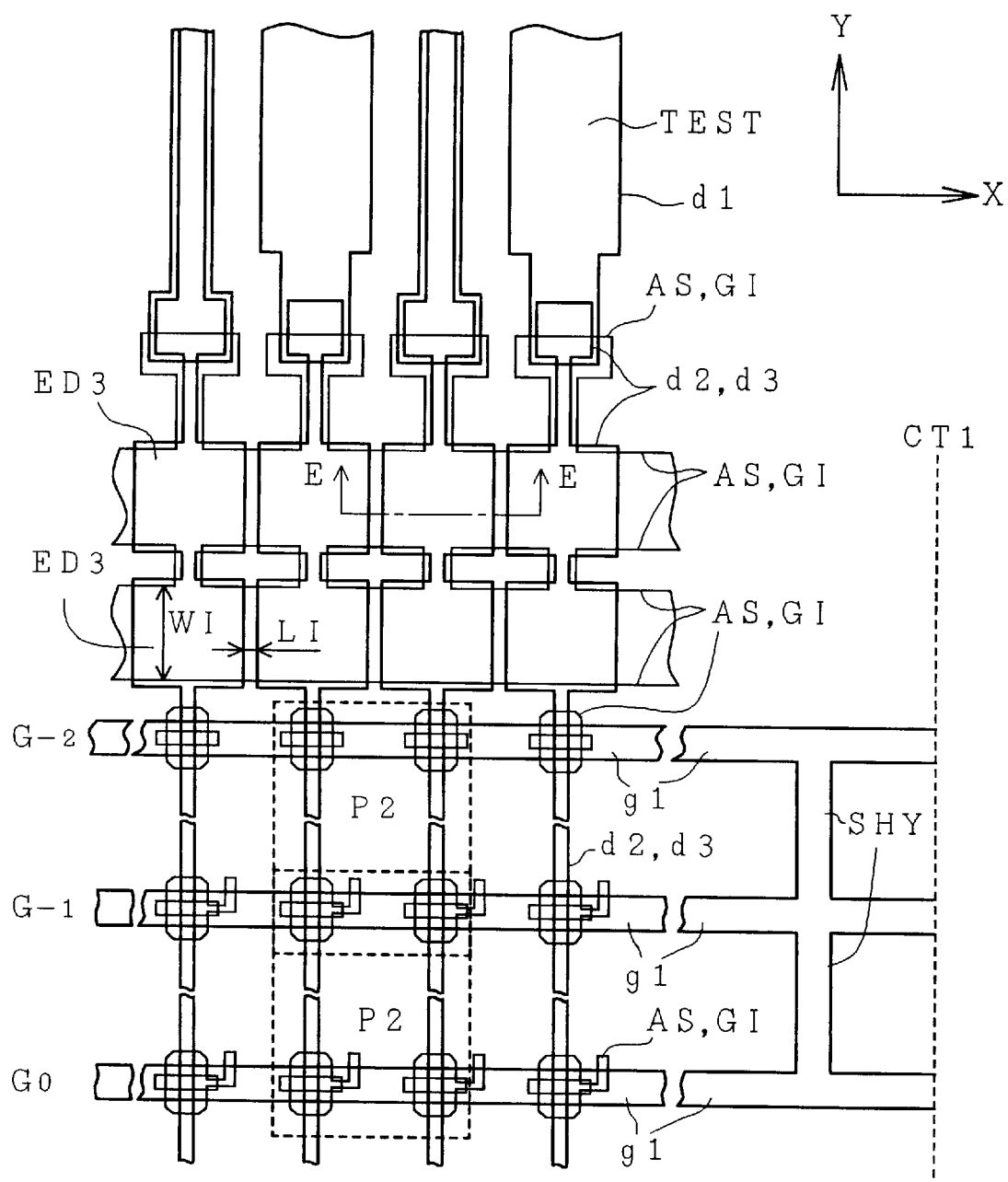
FIG. 2 is a top plan view showing resistor elements for counter-measures against static electricity additional gate lines and additional pixels of a liquid crystal display device according to another embodiment of the invention.

FIG. 2 shows another embodiment of the invention and is a top plan view showing two lines of resistor elements ED3 extended in the direction X between the drain terminals DTM.

Thus, the number of lines of the resister elements ED3 is not especially restricted. However, the one-line structure of FIG. 1 is advantageous when the frame width at the module completion time is desired to be minimized.

Figure 3A:
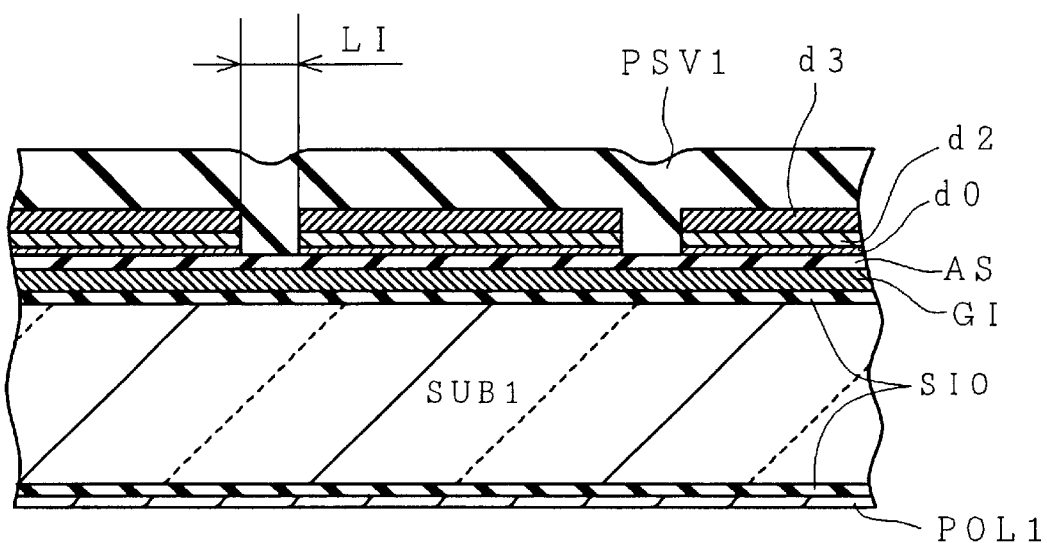
FIG. 3A is a section taken along line E—E of FIGS. 1 and 2.

FIG. 3A is a section taken along line E—E of FIG. 1 and FIG. 2.

Between the drain terminals DTM (between the gate terminals GTM), as shown in FIG. 1, FIG. 2 and FIG. 3A, there is connected the resistor element ED3 which comprises the insulating film GI, the amorphous semiconductor film AS, the semiconductor film d0 and the conductor films d2 and d3. This resistor element ED3 is covered with the passivation film PSV1. Here, the insulating film GI of the resistor element ED3 is formed (see the lefthand section of FIG. 22(G)) in the same layer as that of the insulating film GI of a portion of the gate insulating film of the thin film transistor TFT simultaneously with the formation of the insulating film GI. Likewise, the semiconductor film AS is formed in the same layer as that of the i-type amorphous Si film for forming the channel of the thin film transistor TFT simultaneously with the formation of the i-type amorphous Si film; the semiconductor film d0 is formed in the same layer as that of the N$^+$-type amorphous Si film d0 simultaneously with the formation of the N$^+$-type amorphous Si film d0; and the conductive films d2 and d3 are formed in the same layers as those of the conductive films d2 and d3 for forming the source and drain electrodes SD1 and SD2 simultaneously with the formation of the films d2 and d3.

Since the resistor element ED3 is formed in the seal, it is not exposed to the atmosphere, so that the gap LI of the conductor films d0, d2 and d3 can be designed to a small value.

In this embodiment, the gap LI is set at about 12 microns while the minimum channel size LT of the thin film transistor TFT is about 8 microns, as will be reasoned in the following.

Figure 3B:
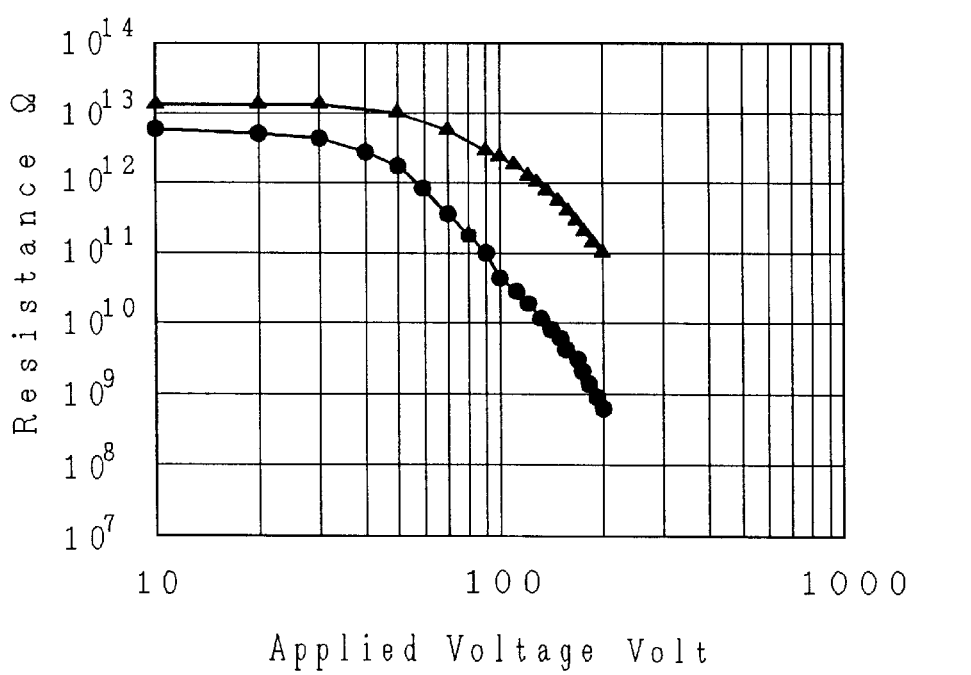
FIG. 3B is a characteristic diagram showing the voltage dependence of resistance of a terminal amorphous semiconductor film AS shown in FIG. 3A.

FIG. 3B shows an example of the characteristic diagram showing the voltage dependence of the resistance of the amorphous semiconductor film AS in one resistor element ED3 between the terminals shown in FIG. 3A.

In the present experiments, the width WI of the resistor element WI is set at a constant value of 26.5 microns, but the gap LI is changed to 12.5 microns and 32.0 microns. The applied voltage is assumed to be pulses of a static electricity applying time of 200 m secants or less, and the resistance of the resistor element ED3 is measured in a light-shielded state by applying a voltage of 0 to 200 V (in steps of 10 V).

For the pulses of up to 200 V, it is found from the graph that the resistor element ED3 does not break down. The dielectric breakdown voltage of the resistor element ED3 has to be about 100 V or higher so that a voltage of about 50 to 100 V may be applied from the terminal at the time of testing the characteristics and at the time of stabilizing the characteristics of the thin film transistor. The dielectric breakdown voltage is a function of the time for which the static electricity is applied. At the time of applying a DC voltage of 200 V, although not shown, it has been found that, when the internal L1 is 12.5 $\mu$m, there starts a mode in which the terminal resistance rises, and a part of the amorphous semiconductor film AS starts to be electrostatically destroyed.

In the resistor element ED3, the conductive films d0, d2 and d3 are formed over the flat semiconductor film AS, so that a more accurate pattern can be formed than in the thin film transistor region. The gap LI can be designed to be smaller than the minimum channel size and can be worked up to about 4 microns. As a result, the breakdown starting voltage of the resistor element ED3 can be sufficiently lowered, so that the electrostatic energy can be sufficiently absorbed by the portion of the resistor element ED3 before the voltage level applied to the thin film transistor by the static electricity is changed to the threshold voltage of the thin film transistor.

Moreover, the resistor element ED3 becomes liable to break down because its resistance non-linearly decreases as the applied voltage increases. Although not shown, it is found that that the resistance is lowered to about one-hundredth at the time of applying a DC voltage than at the time of applying the pulses. While a voltage of 150 V is being applied, when the interval LI is 12.5 $\mu$m, the resistance at the pulse application time is about 8×109 Ω and the resistance at the DC voltage application time is about 5×107 Ω; whereas when the interval LI is 32 $\mu$m, the resistance at the pulse application time is about 6×1011 Ω and the resistance at the DC voltage application time is about 5×1010 Ω. Thus, the load on the resistor becomes lower as the electrostatic voltage becomes higher and the application time becomes longer.

From the results described above, in the embodiment, the interval L1 is substantially equalized to the channel length LT of about 12 microns but can be arbitrarily set in a range from about 4 to 40 microns, matching with the electrostatic characteristics having the worst influence, assuming an electrostatic voltage of 100 to 300 V or more.

In the embodiment, moreover, the width WI is set at about 15 microns. By increasing the width WI, the terminal resistance can be lowered to increase the channel length LI advantageously, thereby preventing the invasion of the static electricity effectively. Since the probability of the drain terminal short-circuit also rises, however, the width WI is preferably one pixel length P1 or less.

By the resistor element ED3, in the process from the cutting on the substrate SUB1 through the mounting of the drive lCs to the module completion, static electricity having invaded from the terminals near the cutting line CT1 can be promptly dispersed without destroying the thin film transistors, suppressing its influence. When a plurality of parallel lines of resistor elements ED3 are provided, the load upon the resistor can be lightened, thereby suppressing the electrostatic influences more.

Moreover, the resistor element ED3 contains the semiconductor film AS having a photoconductivity, so that it is irradiated, if necessary, with a light beam from the back of the substrate SUB1 to reduce the resistance when the resistance is desired to be further reduced for preventing the electrostatic breakdown. When the reduction in the resistance is desired to be canceled at the testing time after the mounting of the drive lCs or after the completion of the liquid crystal display element, the resistance reduction can be canceled to restore the normal operation of the liquid crystal element.

<<Counter-Measures against Static Electricity by Arranging a Plurality of Additional Gate Lines to Short-Circuit the Gate Lines at their Ends>>

FIG. 1 shows one embodiment of the invention, in which the additional lines G0 and G-1 are short-circuited with the short-circuiting line SHY inside the cutting line CT1, opposed (on the sealed side) to the side on which the gate scanning drive ICs are mounted. A pixel P1, as shown in FIG. 19, is extended in the direction X between the first gate line G1 and the additional lien G0, although not shown, and a pixel P2 of the pixels shown in FIG. 19, where the portion near the cutting line 2—2 is omitted and hence the distance in the Y direction is shortened, is extended in the direction X between the additional lines G0 and G-1. By setting the distance of the pixel P2 in the direction Y at about 100 microns and the distance of the resistor element ED3 in the direction Y at about 100 microns, for example, a compact element for the electrostatic counter-measures can be formed with an area such that the distance in the direction Y of one pixel P1 is 64 μm or less. Moreover, the pixel P2 between the aforementioned additional lines can be completely shielded from light by a black matrix BM over the other substrate SUM2 shown in FIG. 19 allowing only the effective pixel region AR to be viewed.

FIG. 2 shows another embodiment of the invention, in which three additional lines G0, G-1 and G-2 extending in the direction X are arranged in addition to the initial stage gate line G1 of the effective pixel region AR. The pixel P2 is formed between these additional lines.

Thus, the number of additional lines is not especially restricted.

When the frame width at the time of completion of the module is desired to be minimized, however, the structure of the additional lines G0 and G-1 of FIG. 1 is advantageous.

By thus forming the additional gates, in the process from the cutting on the substrate SUB1 through the mounting of the drive ICs to the module completion, the static electricity having invaded from the terminals near the cutting line CT1 can be promptly dispersed in the region of the additional thin film transistors around the effective pixel region AR, thereby suppressing its influence upon the inside of the effective pixel region AR. When a plurality of parallel lines of additional gates are provided, the region of the additional thin film transistors therearound can be increased, thereby suppressing the electrostatic influences more.

Moreover, the additional gate lines G-1 and G-2 are short-circuited through the short-circuiting line SHY and fed with the output waveform for turning on/off the thin film transistors from the gate scanning drive IC1 through the additional gate line G0 and the short-circuiting line SHY. Thus, the voltage of the additional gate lines can be fixed and the influences of the static electricity can be suppressed. The short-circuiting line SHY may be formed outside the additional drain line D0. In order to equalize the distortion of the pulse waveform on the additional gate line G0 substantially to that of the gate line G1, however, the short-circuiting is performed, in the embodiment, inside the cutting line CT1 opposed (on the sealed side) to the side on which the gate scanning drive ICs are mounted.

In the embodiment, moreover, the additional drain lines D0 and Dend+1 are formed outside the initial stage drain line D1 and outside the final stage drain line Dend, respectively. Thus, in the region of the thin film transistors added to the periphery of the effective pixel region AR, the static electricity can be promptly dispersed, suppressing the influences of the static electricity inside the effective pixel region AR.

<<Electrostatic Counter-Measures by Resistor Elements ED0, ED1 and ED2 between Gate Terminals GTM or between Drain Terminals DTM Outside Seal Region>>

Figure 9:
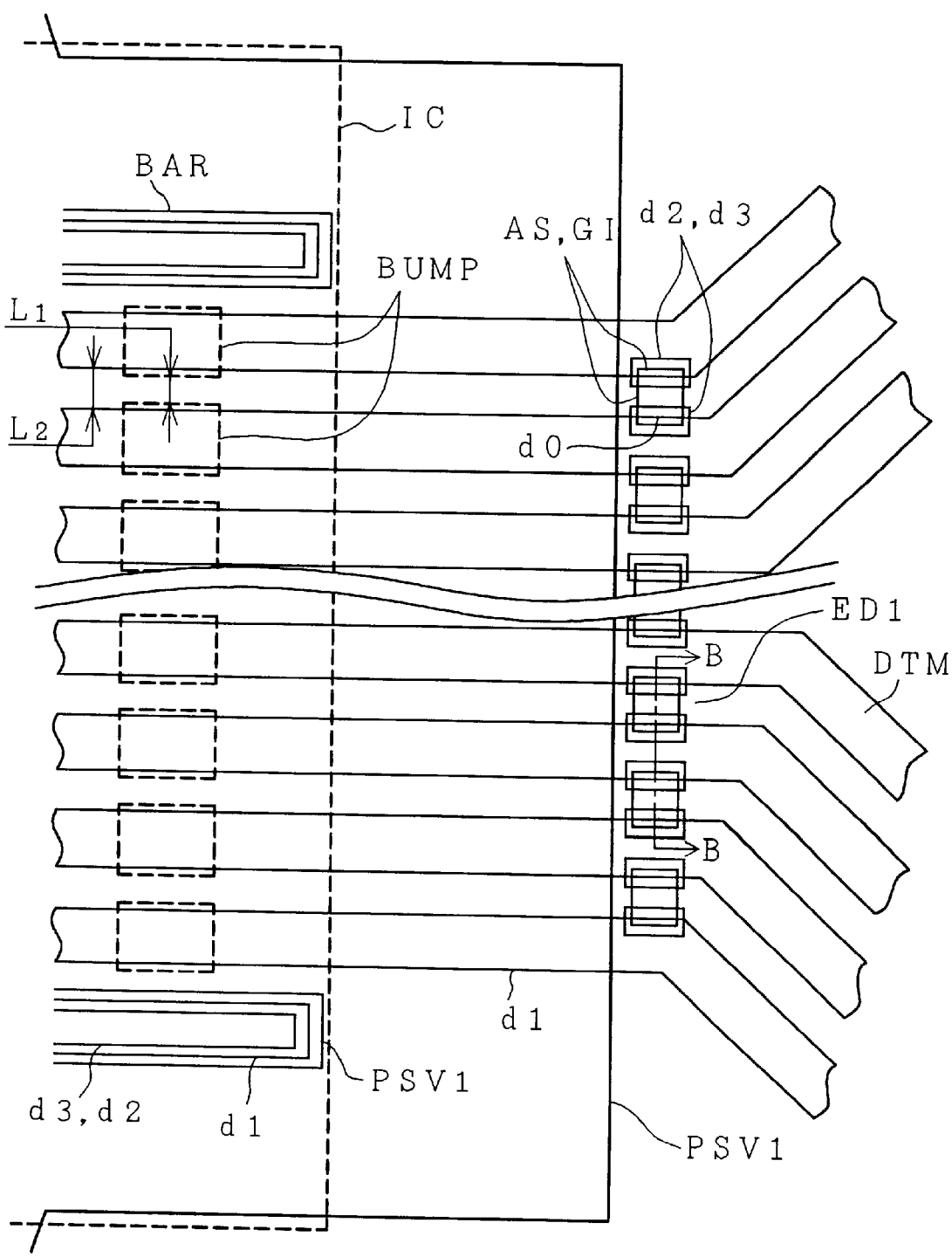
FIG. 9 is an enlarged detail view of an essential portion (the drain output side corner portion) of FIG. 7.
Figure 10:
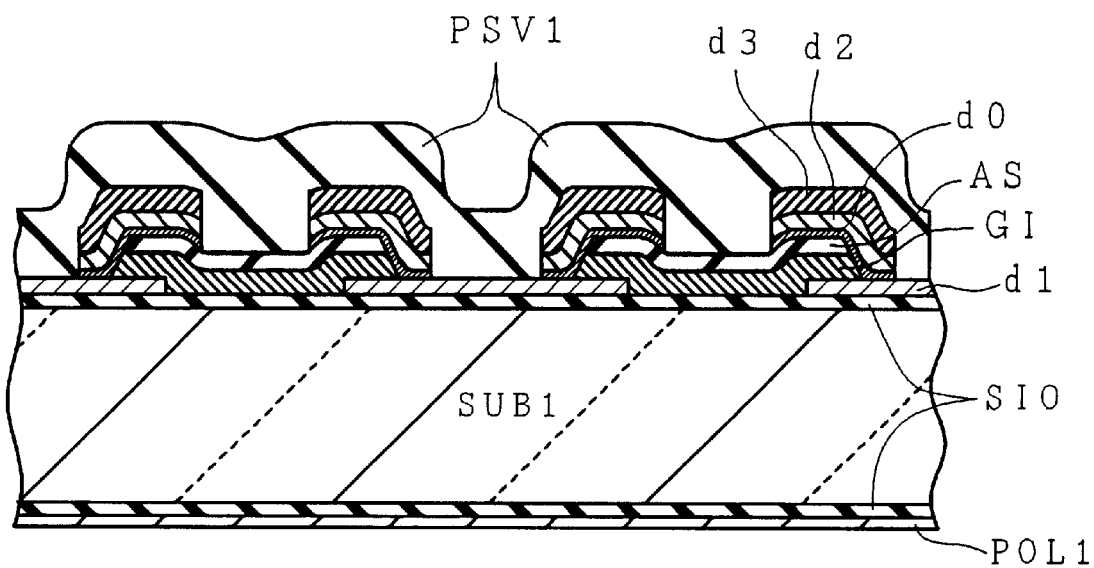
FIG. 10 is a section taken along line B—B of FIG. 9 and FIG. 16.
Figure 18:
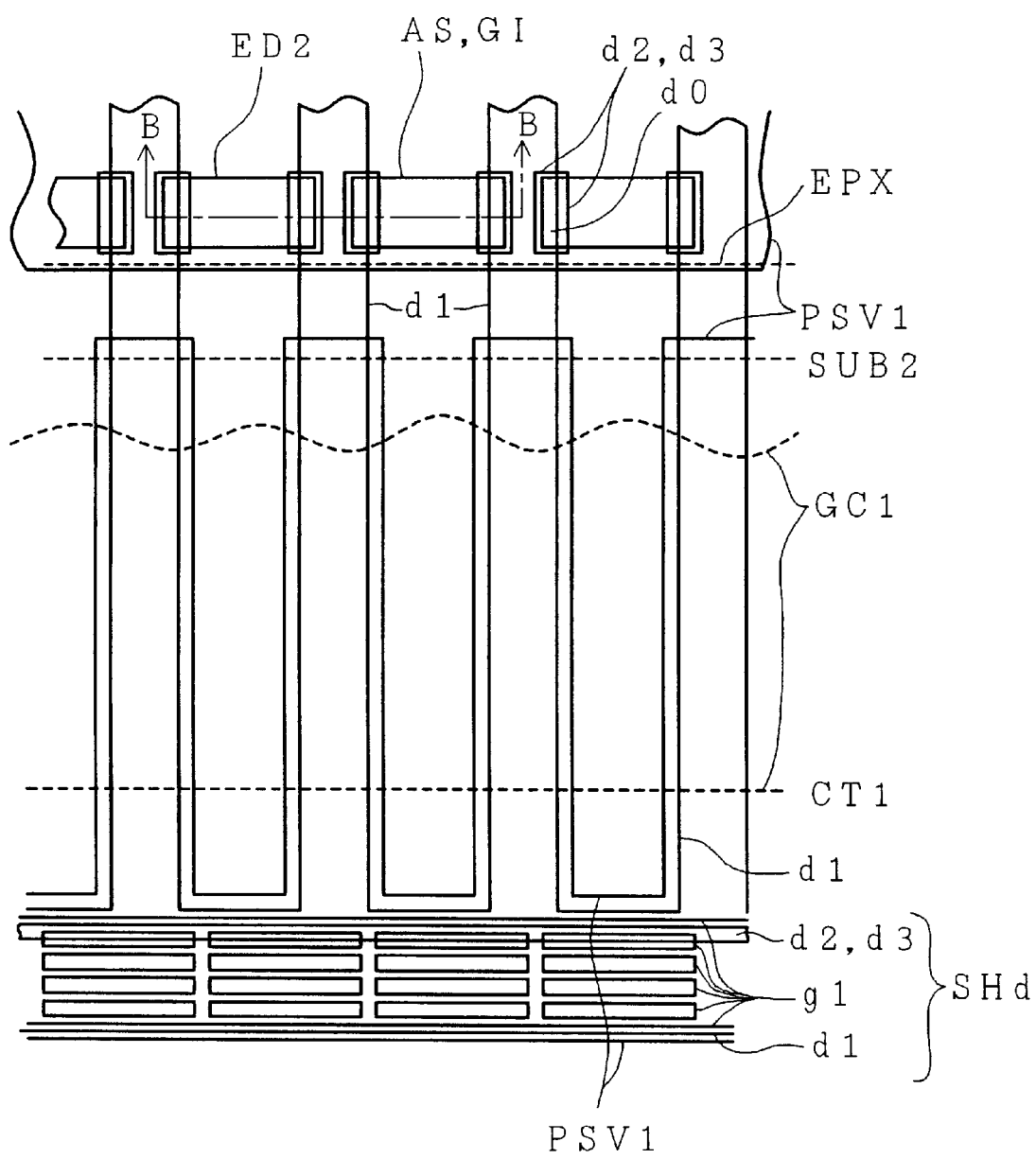
FIG. 18 is an enlarged detail top plan view of a region G of FIG. 5.

FIG. 10 is a section taken along line B—B of FIG. 9 and FIG. 18.

Between the drain terminals DTM or between the gate terminals GTM in the wiring regions on the output side of the drive ICs, as shown in FIG. 4, FIG. 5, FIG. 13 and FIG. 9, there are connected the resistor elements ED0, ED1 and ED2, each of which comprises the insulating film GI, the amorphous semiconductor film AS, the semiconductor film d0 and the conductor films d2 and d3. These resistor elements are covered with the passivation film PSV1. The insulating film GI of the resistor elements is formed in the same layer as that of the insulating film GI of a portion of the gate insulating film of the thin film transistor TFT simultaneously with the formation of the insulating film GI. The semiconductor film AS is formed in the same layer as that of the i-type amorphous Si film for forming the channel of the thin film transistor TFT simultaneously with the formation of the i-type amorphous Si film; the semiconductor film d0 is formed in the same layer as that of the $N^+$-type amorphous Si film d0 simultaneously with the formation of the $N^+$-type amorphous Si film d0; and the conductive films d2 and d3 are formed in the same layers as those of the conductive films d2 and d3 for forming the source and drain electrodes SD1 and SD2 simultaneously with the formation of the conductive films d2 and d3. Here in FIG. 10, the length of the semiconductor film AS between the conductive films d2 and d3 is set at about 20 microns or more, considering that the dielectric breakdown voltage is lowered by the influences of the atmosphere. Specifically, it is about 30–100 μm.

As a result, for each drive IC, the gate terminals GTM (or the drain terminals DTM) connected with the gate lines GL (the drain lines DL) are connected by the resistor elements. This makes it possible to make the load of the resistors lighter than the resistance between the gates and drains of the thin film transistors formed as the switching elements. As a result, the static electricity having invaded can be promptly dispersed without breaking down the thin film transistors, suppressing its influence in the process from the formation of the wiring lines on the substrate SUB1 to the mounting of the drive ICs.

Moreover, the resistor element ED contains the semiconductor film AS having a photoconductivity and is formed in the vicinity of the drive IC. Therefore it is irradiated, if necessary, with a light beam to reduce the resistance when the resistance is desired to be further reduced for preventing the electrostatic breakdown. When the reduction in the resistance is desired to be canceled at the testing time after the mounting of the drive ICs or after the completion of the liquid crystal display element, the resistance reduction can be canceled to restore the normal operation of the liquid crystal element because the resistor element is covered with the silicon resin SIL or the like because of the mounting of the drive IC and consequently it is not irradiated with the light beam.

<<Electrostatic Counter-Measures by Short-Circuiting Lines SHg, SHd and SHa>>

Figure 7:
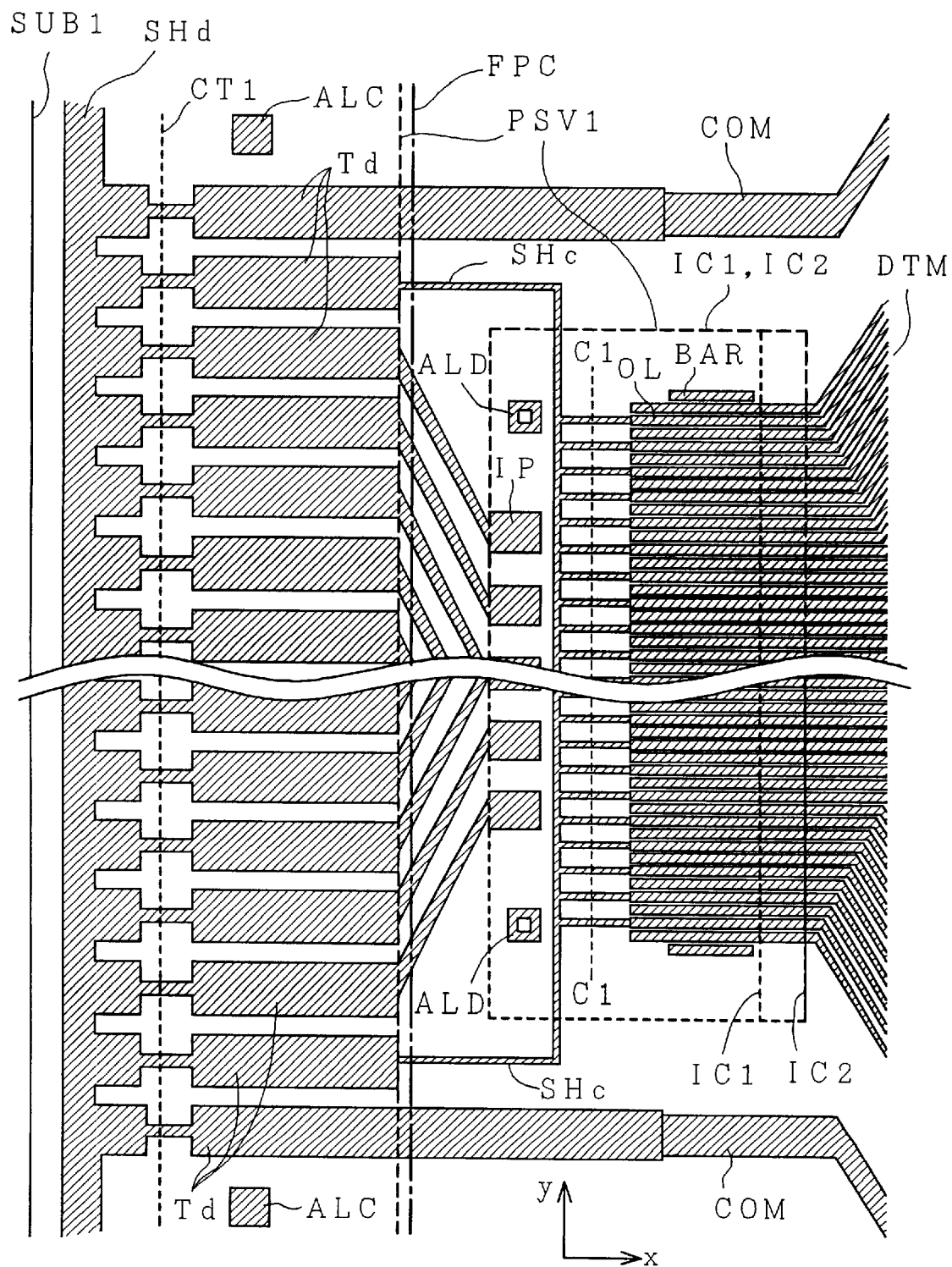
FIG. 7 is a top plan view of essential portions in the periphery of the drain drive IC mounting region of the substrate SUB1 and in the vicinity of the cutting line CT1 of the same substrate, of the liquid crystal display element according to the invention.

FIG. 7 is a top plan view of essential portions in the periphery of the drive IC mounting region of the transparent insulating substrate SUB1 and in the vicinity of the cutting line CT1 of the same substrate, and FIG. 5 is a top plan view of the entirety of the transparent insulating substrate SUB1 in a surface treating process before the cutting along a cutting line CT1.

In FIG. 5, one lower transparent insulating substrate SUB1 constituting the liquid crystal display element has a larger area than that of the upper transparent insulating substrate SUB2, as shown in FIG. 17, and is cut along the cuffing line CT1 shown by the dotted lines at a later cutting step, and its outer portions are discarded.

On the face of the transparent insulating substrate SUB1 at its central portion excepting the periphery of its surface, there are formed at first a group of gate lines GL, which are extended in the direction X and parallel in the direction Y. and a group of drain lines DL which are extended in the direction Y and parallel in the direction X.

Although not shown, these gate line group and drain line group are insulated from each other through an inter-layer insulating film.

Moreover, the display region is constructed of the region in which the gate line group and the drain line group intersect, and the pixel region is a region which is surrounded by the two adjacent gate lines GL and the two adjacent drain lines DL.

In each pixel region, more specifically, there are formed a thin film transistor (TFT) as the switching element, and a pixel electrode made of a transparent electrode. When the scanning signal is fed to the gate line GL, the thin film transistor is turned on to feed the video signal therethrough from the drain line DL to the pixel electrode.

Terminals are led out, with the display region therebetween, from only one side of the individual gate lines GL of the gate line group and the individual drain lines DL of the drain line group. As shown in FIG. 5, more specifically, one end (on the upper side of the drawing) of the gate line GL is connected with the gate scanning drive IC, and the other end (on the lower side of the drawing) is short-circuited with the gate short-circuiting line SHg at the extended part over the cutting line CT1 shown by the dotted lines. As a result, the static electricity generated at each gate line GL is dispersed through the gate short-circuiting line SHg which is formed on the face of the transparent insulating substrate SUB1 and cut along the cuffing lines CT1 and discarded at a subsequent step.

One end (on the righthand side of the drawing) of the drain line DL is connected with the drain scanning drive IC, and the other end (on the lefthand side of the drawing) is alternately short-circuited with the drain short-circuiting line SHd at the extended part over the cutting line CT1 and is alternately short-circuited with the drain short-circuiting line SHc in the vicinity of the IC mounting region (see FIG. 7). As a result, the static electricity generated at each drain line DL is dispersed through the drain short-circuiting line SHd which is formed on the face of the transparent insulating substrate SUB1 and cut along the cutting lines CT1 and discarded at a subsequent step.

Moreover, the gate short-circuiting lines SHg and SHa and two drain short-circuiting lines SHd thus formed are capacitively coupled through the capacitors ESD on the face of the transparent insulating substrate SUB1 and are cut and discarded at a subsequent step. As a result, whether or not the drain lines are short-circuited can be easily checked by bringing a testing probe into contact with the two drain short-circuiting lines SHd.

This capacitor ESD prevents the thin film transistor formed in each pixel region from electrostatically breaking down. Therefore, the capacitance of the capacitor ESD is set at a lower value than that of the thin film transistor.

Reference symbol AO shown in FIG. 5 designate an anodizing wiring line for feeding a current to form an anodized film on the surface of the gate lines GL. Two anodizing pads PAD are formed at both ends of the anodizing wiring line AO, i.e., over the transparent insulating substrate SUB1. These anodizing pads PAD are electrodes for feeding the electric current when, in this case, the insulating film of an aluminum oxide (or alumina) is formed by anodizing the surface of the gate lines GL made of aluminum (Al), for example.

Moreover, the transparent insulating substrate SUB1 thus constructed is checked on whether or not the gate lines GL are disconnected. The test terminal (pad) TEST is formed at the end portion on the display region side in the vicinity of the region where the gate scanning drive IC is mounted, that is, at the end portion of the gate line GL which is not connected with the gate short-circuiting line SHg. As a result, whether or not the gate line GL is disconnected can be checked by bringing one testing probe into contact with the gate short-circuiting line SHg side with which the gate lines GL are commonly short-circuited, and by bringing the other testing probe sequentially into contact with the testing terminals TEST of the individual gate lines GL. At the time of anodization, moreover, the anodized film is prevented from being formed, by applying a resist film to the gate short-circuiting line SHg (AO) with a dispenser in such a way that the disconnection of the gate lines may be tested thereafter by bringing the probe into contact. This resist film is removed before the tests.

It is also checked whether or not the drain lines DL are made disconnected. Specifically, the drain line DL short-circuited with the drain short-circuiting line SHd shown on the lefthand side of FIG. 5 is equipped with the testing terminal TEST at the end portion on the IC mounting side (on the righthand side). The drain line DL short-circuited with the drain short-circuiting line SHd through the drain short-circuiting line SHc on the righthand side is equipped with the testing terminal TEST at the end portion opposed (on the lefthand side) to the IC mounting side. As a result, whether or not the drain line DL is disconnected can be checked by bringing one testing probe into contact with the drain short-circuiting line SHd side with which the drain lines DL are commonly short-circuited, and by bringing the other testing probe sequentially into contact with the testing terminals TEST of the individual drain lines DL.

<<Electrostatic Counter-Measures by Short-Circuiting Line SHc below Drive IC>>

As shown in FIG. 7, both the inputs and outputs of the drain drive IC are led out from one side of the IC chip. As already described with reference to FIG. 5, the drain lines DL are alternately arranged in the staggered directions such that one is extended over the cuffing line CT1 and is connected with the drain short-circuiting line SHd extending in the direction Y and short-circuited whereas the other is extended over the cutting line CT1 through the short-circuiting line SHc and the input wiring line Td (to the drain line driving IC) and is connected with the drain short-circuiting line SHd and short-circuited, as shown in FIG. 7. In other words, every other drain line DL is connected with the short-circuiting line SHc and are short-circuited for each driving IC. The short-circuiting line SHc is connected with the two input wiring lines Td of the drain line driving IC and short-circuited to the drain short-circuiting line SHd through the two input wiring lines Td. Thus, the static electricity generated in the drain lines DL and the input wiring lines Td is dispersed through the short-circuiting line SHc and the drain short-circuiting line SHd. The completed liquid crystal display element is not operated, unless the short-circuiting is canceled, and consequently the drain short-circuiting line SHd is formed on the face of the transparent insulating substrate SUB1 outside the cutting line CT1 along which the transparent insulating substrate SUB1 is cut to discard the outside portion. The cancellation of the short-circuiting of the drain line DL connected directly with the drain short-circuiting line SHd is effected by cutting the substrate SUB1 along the cutting line CT1. On the other hand, the cancellation of the drain line DL connected with the drain short-circuiting line SHd through the short-circuiting line SHc and the input wiring line Td is not effected by cutting the substrate SUB1 along the cuffing line CT1, due to the presence of the short-circuiting line SHc. The short-circuit cancellation will be described later.

In FIG. 5, a mounting region (shown by dotted lines and denoted by reference symbol IC in FIG. 5) where the gate line driving IC is mounted is provided inside the cutting line CT1 among the regions in which the gate lines GL are formed and in the vicinity of the upper cutting line CT1 shown on the upper side of FIG. 5. The extended portion, opposed to the mounting region in the extending direction, of each gate line GL over the cutting line CT1 is connected through the gate short-circuiting line SHg (acting also as the anodizing wiring line AO) extending in the direction Y. The completed liquid crystal display element does not operate, unless the short-circuiting is canceled, and therefore the gate short-circuiting lines SHg and SHa are formed on the faces of the transparent insulating substrate SUB1 outside the cutting line CT1 along which the transparent insulating substrate SUB1 is cut to discard the outside portion. Unlike the aforementioned drain line DL side, in the embodiment, the short-circuiting line SHc is not provided for each IC on the gate line GL side. This is because the gate line driving ICs are arranged only on one side, so that the gate lines GL can be short-circuited with each other through the gate short-circuiting lines on the opposite side (where no gate line driving IC is provided). When the gate line driving ICs are arranged on both sides or when the gate short-circuiting line SHg is not provided, however, the gate lines GL have to be connected with the gate short-circuiting line SHg through the short-circuiting line SHc.

Figure 8:
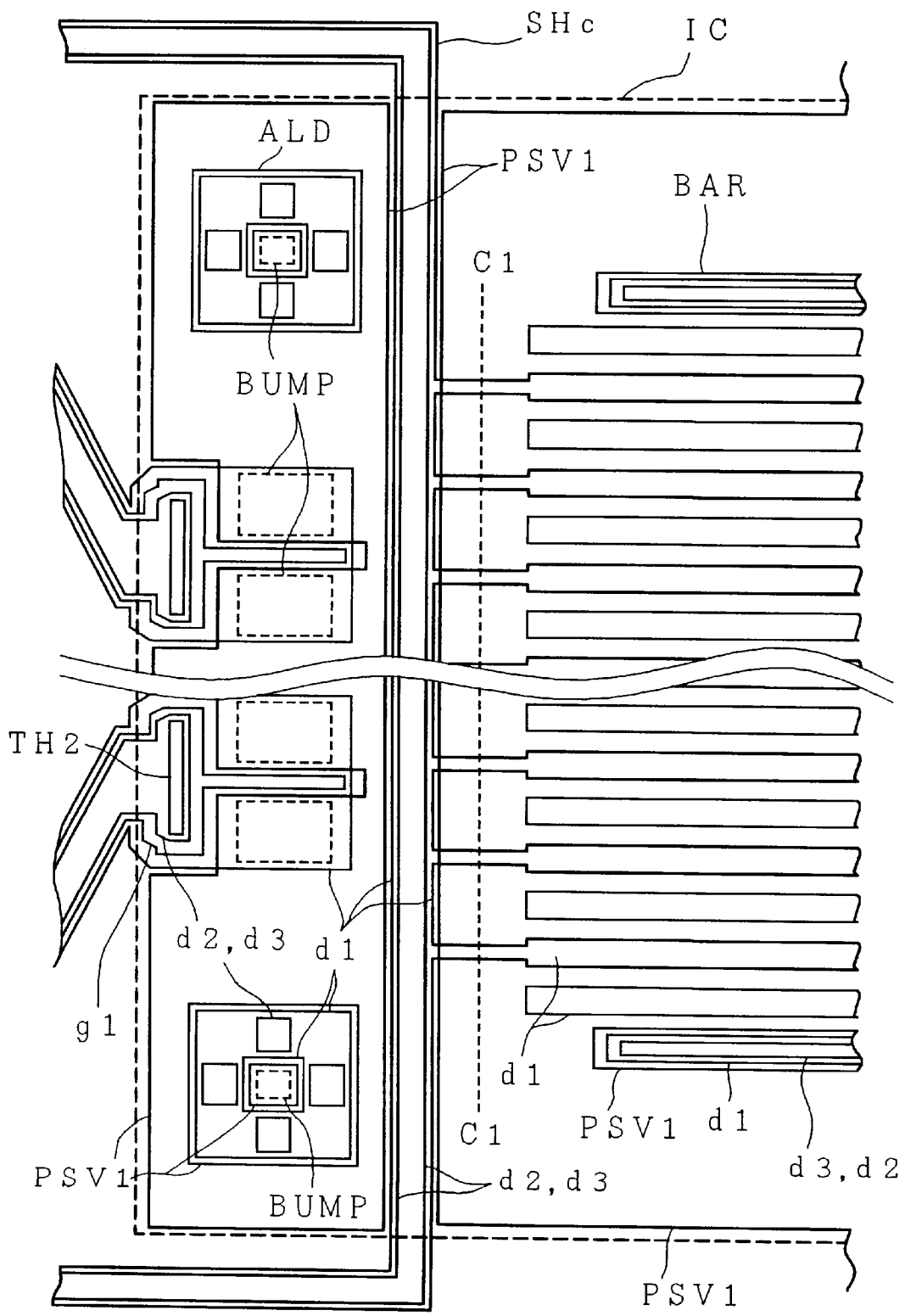
FIG. 8 is an enlarged detail view of an essential portion (the drain input side corner portion) of FIG. 7.

The short-circuiting line SHc and the alternate drain terminals DTM and input wiring lines Td are cut away along one cuffing line C1 by a laser beam or by photo-etching before the driving ICs are mounted on the substrate SUB1, as shown in FIGS. 7 and 8. As a result of this cuffing, as shown in FIG. 7, a passivation film PAS1 (i.e., the passivation film PSV1) is not formed in the region (the IC mounting region) having the cutting line C1. In this embodiment, the short-circuiting can be easily canceled by the single cutting along the cutting line C1.

The wiring line DTM at the portion along the cutting line C1 is formed of a transparent conductive film ITO, which is less contaminated even in the laser beam cutting, so that its contamination can be suppressed. Moreover, this cutting may be effected by photoetching.

The drain drive IC side is shown in FIG. 7, but the structure having this short-circuiting line SHc can naturally be applied to the case in which the outputs and inputs are led out from one side of the IC chip even on the gate scanning drive lCs side.

<<Electrostatic Counter-Measures by Separation of Gate Terminals Tg and Gate Short-Circuiting Line SHa>>

Figure 13:
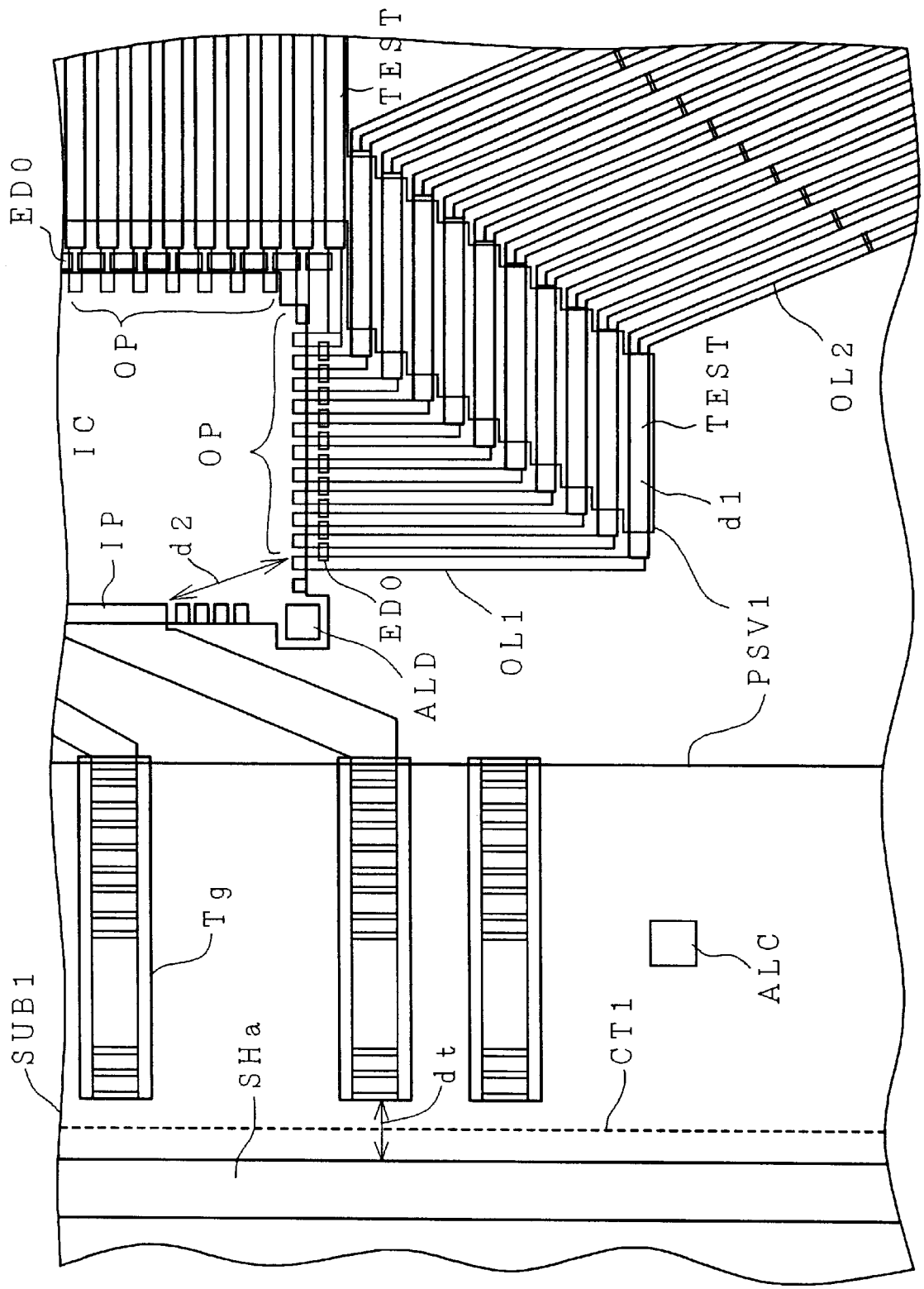
FIG. 13 is an enlarged detail top plan view of an end portion of the gate scanning drive IC mounting region.

FIG. 13 is an enlarged detail top plan view of an end portion of the gate scanning drive IC mounting region. In FIG. 13, reference symbol Tg designates input wiring lines which are formed over the substrate SUB1 and led to the gate scanning drive ICs mounted on the substrate SUB1; symbol IP designates input terminals (pads) which are located at the IC side end portion of the input wiring lines Tg and connected with the input bump of the ICs; symbol OP designates output terminals which are connected with the output bump of the lCs; symbol OL1 and OL2 designate output wiring lines which are led from the output terminals OP to the gate lines; symbol TEST designates gate line disconnection testing terminals which are interposed between the output terminals OP and the gate lines GL; symbol dt designates the minimum distance between the short-circuiting line SHa and the input wiring line Tg; and symbol d2 designate the minimum distance between the input terminals IP and the output terminals OP.

In the flip-chip transparent insulating substrate SUB1 where the drive ICs are directly mounted thereover, as apparent from FIG. 5, the input wiring lines Tg and the input terminals (designated by reference symbol IP in FIG. 13) to the gate scanning ICs have to be disposed on the side where the ICs are mounted.

In intermediate portions of the output wiring lines OL from the output terminals OP, moreover, the disconnection testing terminals TEST have to be formed for testing the disconnection of the individual gate lines between the output wiring lines OL and the short-circuiting lines SHg. In the structure of the prior art, therefore, the input terminals IP and the output terminals OP have to be electrically opened so that the individual input wiring line Tg are connected with the short-circuiting line SHa and short-circuited with the anodizing wiring lines AO therearound for the electrostatic counter-measure.

When the input terminals IP and the gate short-circuiting line SHa are connected, however, it has been found that an electrostatic spark is caused in the space (denoted by d2) between the output terminals OP of the individual gate lines GL existing in the region mounted with the drive lCs and the input terminals IP of the input wiring lines Tg to the lCs which are connected with the gate short-circuiting line SHa in the prior art (but not in this structure), as shown in FIG. 13.

It is considered in the structure of the prior art that when the static electricity invades the effective screen region through the passivation film PSV1, for example, a potential difference due to the static electricity is caused by the electric impedance which is a load upon the gate lines and is concentratedly applied between the input terminals IP being electrically open and the output terminals OP.

As a result, the input terminals IP or the output terminals OP formed of the ITO (Indium Tin Oxide), for example, are destroyed, resulting in that the drive lCs cannot be mounted.

By leaving the input wiring lines Tg having the input terminals IP disconnected from the gate short-circuiting line SHa, that is, by electrically isolating (electrically floating) the input wiring lines Tg from the gate short-circuiting line SHa, therefore, the distance between the output terminals OP and the gate short-circuiting line SHa can be increased to lower the field intensity, thereby preventing the terminals from being destroyed by the electrostatic spark produced.

By making the minimum distance dt between the gate short-circuiting line SHa and the end terminals of the input wiring lines Tg to the gate scanning drive lCs shorter than the minimum distance d2 between the input terminals IP and the output terminals OP, more specifically, electrostatic spark, if any, is produced at the portion of the distance dt but prevented at the portion of the distance d2.

<<Rubber Cushion GC>>

Figure 26A:
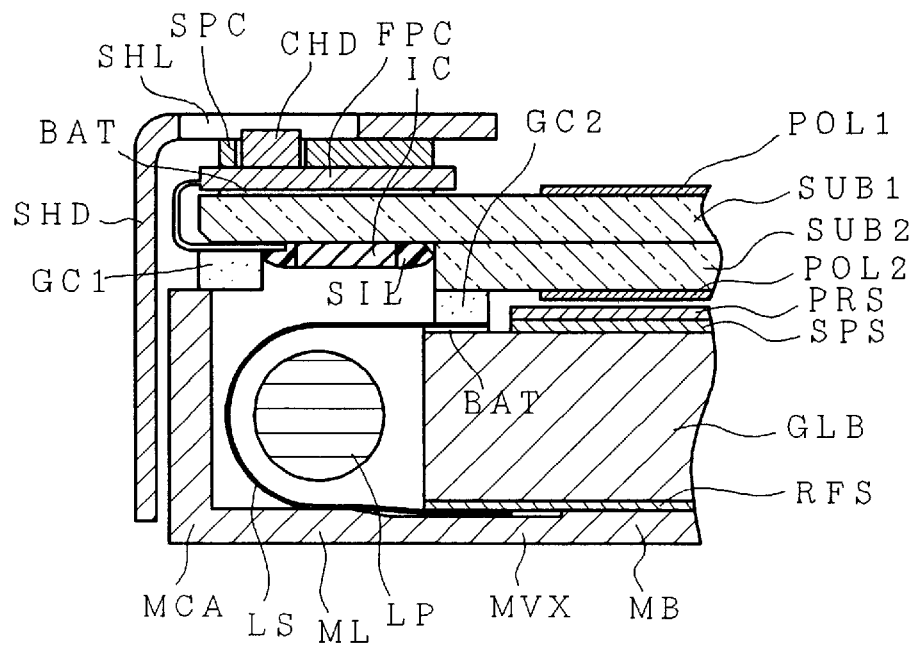
FIGS. 26A and 26B are sections of essential portions of the liquid crystal display module.
Figure 26B:
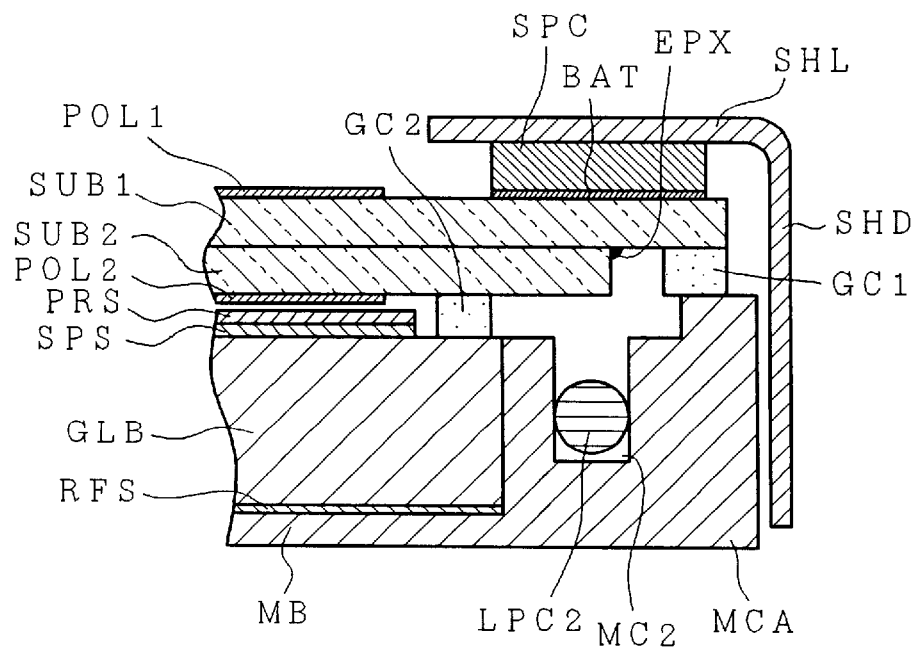

FIGS. 26A and 26B are sections of the essential portions of the liquid crystal display module.

A rubber cushion GCl is sandwiched between the flexible substrate FPC on the periphery of the frame of the substrate SUB1 of the display panel PNL and a lower case MCA. As a result, a pressure is applied to fix the flexible substrate thereby to improve the reliability of the connection between the substrate SUB1 and the wiring pattern. Moreover, the driving lCs and the substrate SUB are prevented from contacting with the lower case MCA and from being mechanically damaged.

A rubber cushion GC2 is sandwiched between the substrate SUB2 of the display panel PNL and a reflecting sheet LS over a light guide plate GLB. By making use of the elasticity of the rubber cushion GC2 to force a metallic shield case SHD into the device, fixing hooks integrated with the side face of the shield case SHD are caught by fixing projections integrated with the side face of the shield case SHD, and fixing pawls integrated with the side face of the shield case SHD are bent and inserted into fixing recesses integrated with the side face of the lower case MCA. As a result, the fixing members serve as stoppers, the shield case SHD and the lower case MCA are fixed, and the module is firmly retained in its entirety, requiring no other fixing member. Thus, the assembly can be facilitated, lowering the manufacture cost. Moreover, a high mechanical strength and a high vibration/impact resistance can be achieved, improving the reliability of the device. An adhesive is applied to one side of the rubber cushion GCl or GC2 so that the rubber cushion GCl or GC2 is stuck to predetermined portions of the flexible substrate FPC and the substrates SUB1 and SUB2.

<<Electrostatic Counter-Measures for Mounting Rubber Cushion GCl >>

FIG. 18 is an enlarged detail top plan view of a region G of FIG. 5.

As has been described with reference to FIG. 26B, the rubber cushion GC1 is mounted as an elastic spacer having a thin and slender shape along the four edges which exert no influence upon the display of the lower face of the liquid crystal element. In other word, between the lower face of the transparent insulating substrate SUB1 in one plate of the liquid crystal display element end portion and the upper face of the lower molded case MCA for housing/holding the light guide plate GLB, a fluorescent lamp LP (see FIG. 26A) and so on, there is sandwiched the rubber cushion GC1 for retaining the individual members such as the liquid crystal display element, the lower case MCA and the metallic shield case SHD.

In the flip-chip liquid crystal display element of the so-called single side lead-out type in which only one side of the drain lines DL are connected with the drive ICs, as shown in FIG. 5, the end portions, the side not connected with the drive ICs, of the drain lines DL are connected over the cut line CT1 of the substrate SUB1 with the drain short-circuiting line SHd which is formed outside the cutting line CT1. Even after the cutting of the substrate SUB1 along the cutting line CT1, therefore, the video signal lines DL are present up to the end portion of the substrate SUB1. Conventionally, in the end portions of the video signal lines DL on the side having no packaged driving IC, the transparent conductive film d1 is exposed to the outside so that the rubber cushion GCl is in contact with those end portions, as shown in FIG. 26B. When the rubber cushion GCl is replaced for repair after mounted or after the product is completed, static electricity is produced because of the charge of the rubber cushion GC or the potential state of the substrate SUB1 when the rubber cushion GC is mounted, or mounted or repositioned. The static electricity may invade the liquid crystal display element to cause a defect that the threshold voltage of the thin film transistors of the liquid crystal display element is shifted.

As a result, over the transparent conductive film d1 of the video signal lines DL present on the face of the transparent insulating substrate SUB1 at the single plate portion of the liquid crystal display element end portion shown in FIG. 26B, that is, at the end portion of the substrate SUB1, with which the rubber cushion GC1 is in contact, there is formed the passivation film PSV1, as shown in FIG. 18. This passivation film PSV1 is formed, simultaneously with the formation of the passivation film PSV1, of a silicon oxide or nitride film formed in the plasma CVD apparatus, for example, and has a thickness of about 0.6 microns. As a result, the rubber cushion GC and the transparent conductive film d1 of the video signal lines DL are kept from direct contact, and an insulating resistance is established by the passivation film PSV1. Therefore static electricity can be prevented from being produced and entering the video signal lines DL at the time of mounting the rubber cushion GC, thereby preventing dielectric breakdown. During the cutting along the cutting line CT1 by using a cutter, a crack is liable to occur in the passivation film PSV1 which is formed in the portion along the cutting line CT1. Even if the passivation film PSV1 cracks, it is formed separately from the passivation film PSV1 formed in the display region, so that the crack does not develop to the insulating film of the display region. The passivation film PSV1 is extended, as shown in FIG. 18, over the drain short-circuiting line SHd outside the cutting line CT1. After the substrate cutting, the passivation film PSV1 is present as far as the end region of the substrate SUB1, so that it is effective in preventing the dielectric breakdown and can improve the electrolyte corrosion resistance of the transparent conductive film d1 of the video signal lines DL. In order to improve the dielectric breakdown and the electrolyte corrosion resistance, since the passivation film PSV1 is positioned at the end portion of the substrate SUB after cut, the position of the passivating film PSV1 formed together with the cutting line CT1 is determined considering the error of about 300 microns of dicing with a cutter. In this embodiment, the passivation film PSV1 is formed not on one face of the end region of the substrate SUB1 but along the pattern of the transparent conductive film d1 of the video signal lines DL with a larger size than that of the patter. As a result, it is possible to reduce the percentage of occurrence and development of the crack in the passivation film PSV1 existing in the portion of the cutting line CT1 at the time of cutting the substrate SUB1. As a result, the electrolyte corrosion resistance can be improved. However, a structure can be considered such that it covers one face of the end region but not only at the cut portion, and the pattern is not limited to the one of the embodiment. The end portions, opposed to the side of the passivation film PSV1, of the video signal lines DL are connected with the drive ICs, as shown in FIG. 5. Reference symbol EPX of FIG. 18 designates an epoxy region for increasing the adhesion strength of the substrates SUB1 and SUB2 (as shown in FIG. 17). The distance from the cutting line CT1 to the upper substrate SUB2 is about 1 mm.

<<Opaque Film Pattern for Detecting Misalignment of Driving IC Chip>>

FIG. 8 is an enlarged detail view of an essential portion (the corner portion on the drain input side) of FIG. 7, and FIG. 9 is an enlarged detail view of an essential portion (the corner portion on the drain output side) of FIG. 7.

Reference symbol BAR of FIGS. 7 to 9 designates a pattern for detecting the misalignment of the mounted drive ICs. On the substrate SUB1 in the vicinity of the wiring line d1 connected with the bump BUMP of the drive ICs and in the vicinity of the BUMP, there is provided the pattern BAR which includes an opaque film for detecting the misalignment of the drive ICs. This misalignment detecting pattern BAR is constructed, as shown in FIGS. 8 and 9, of the conductive film d1 made of the ITO film described in the <<Method of Preparing Transparent Insulating Substrate SUB1 >>; the second conductive film d2 made of Cr; the third conductive film d3 made of Al—Pd, Al—Si, Al—Ta, Al—Ti—Ta or the like; and the passivation film PSV1. In short, the pattern BAR includes the opaque films d2 and d3. This patterns BAR are provided at a pitch equal to that of the wiring lines and the bumps BUMP. The wiring lines, which are formed over the transparent insulating substrate SUB1 and connected with the bumps mounted on the substrate SUB1 and made of gold (Au) of the drive lCs, are formed in the prior art of the single layer of the transparent conductive film d1. Therefore, after mounting the drive ICs, it is difficult to detect the mounting misalignment of the drive ICs with respect to the wiring line d1, from the side opposed to the side mounted with the drive ICs, of the transparent insulating substrate. In the structure of this invention, however, the provision of the pattern BAR having the opaque films makes it possible to easily confirm the mounting misalignment of the drive ICs with respect to the wiring line d1 either visually or by using a microscope from the side, opposed to the side mounted with the drive ICs, of the transparent insulating substrate SUB1 after the mounting of the drive lCs. As a result, it is possible to improve the manufacture yield and the throughput. The uppermost passivation film PSV1 of the pattern BAR is provided for preventing the electrolyte corrosion of the conductive films d2 and d3.

The misalignment detecting pattern BAR may include at least one opaque film and may use a colored film such as an i-type amorphous Si film AS in addition to the conductive films d2 and d3.

<<Counter-Measures for a Plurality of types of Drive IC Chip>>

In the transparent insulating substrate SUB1 shown in FIG. 7, consideration is taken in advance to enable a plurality of different types of drive IC chip to be mounted, and the input and output terminals connected with the input and output bumps of the drive ICs and their wiring lines are formed and arranged over the substrate SUB1. Reference symbol IC1 and IC2 of FIG. 7 designate the positions in which two types of drive IC having different widths in the direction X are mounted. The input terminals IP with which the input bumps of the drive ICs are connected, and their wiring lines are provided to include the dummy input terminals, adaptably to the different kinds of chip and their wiring lines. Specifically, the arrangement of the bumps, to which a predetermined signal or power supply is inputted, is different depending upon the kind of the chip, and the input terminals and the wiring lines are so provided in advance as to be adaptable to the bump arrangement of a plurality of kinds of chips. Moreover, output wiring lines OL with which the bumps of the drive ICs are connected are provided in parallel with each other over a predetermined length such that a plurality of kinds of drive lCs having different lengths in the wiring line extending direction (in the direction X of FIG. 7) can be mounted. Conventionally only one kind of drive IC can be mounted on one kind of transparent insulating substrate SUB1. When the kind of the drive IC chip has to be changed because it cannot be available or for another reason, the wiring layout of the transparent insulating substrate for mounting the chip has to be changed or redesigned, causing a problem of the raised manufacture cost. In the substrate SUB1 shown in FIG. 7, on the contrary, the wiring lines with which the bumps of the chip are connected are formed and arranged over the substrate SUB1, so that different kinds of chip may be mounted. The transparent insulating substrate SUB1 can be commonly used for the plurality of kinds of chip, so that it need not be changed even when the chips are changed. This can lower the manufacture cost.

<<Alignment Mark between Drive IC and Substrate SUB1>>

Alignment marks ALD for the drive ICs are formed over the transparent insulating substrate SUB1, as shown in FIG. 7, in the region where the drive ICs overlap the substrate SUB1, that is, in the region encompassed by dotted lines and denoted by the reference symbols IC1 and IC2. On the opposed face of the drive IC to the substrate SUB1, as shown in FIG. 8, there is formed a dummy bump BUMP which acts as an alignment mark paired with the alignment mark ALD. This bump BUMP is made smaller than the alignment mark ALD and is shaped such that the alignment mark ALD encloses the bump BUMP when the drive IC is mounted on the substrate SUB1. The alignment mark ALD is constructed, as seen from FIG. 8, of the conductive film d1 made of the ITO film; the second conductive film d2 made of Cr; the third conductive film d3 made of Al—Pd, Al—Si, Al—Ta, Al—Ti—Ta or the like; and the passivation film psvi (as in the <<Method of Fabricating Transparent Insulating Substrate SUB1>>). The second conductive film d2 and the third conductive film d3 can be easily recognized because they are opaque. Moreover, the uppermost passivation film PSV1 prevents the conductive films d2 and d3 from being electrochemical corroded. As a result, the drive ICs can be electrically connected in highly accurate positions with the wiring pattern on the substrate SUB1.

Reference symbol ALC designates alignment mark which is formed over the transparent insulating substrate SUB1 within the region, in which the flexible substrate FPC overlaps the substrate SUBI so as to effect the alignment with the flexible substrate FPC. On the opposed face of the flexible substrate FPC to the substrate SUB1, moreover, there is formed an alignment mark (not shown) paired with the alignment mark ALC. The not-shown mark is made larger than the alignment mark ALC and is shaped into a square shape to enclose the alignment mark ALC when the flexible substrate FPC is mounted on the substrate SUB1. The alignment mark ALC is formed of a square pattern for covering the transparent ITO film which is employed as a transparent pixel electrode material over the opaque Al employed as the material of the gate wiring lines.

Here will be described the manufacture flow of the step of mounting the drive lCs and the flexible substrate FPC on the transparent insulating substrate SUB1.

First of all, the anisotropic conductive film ACF2 (see FIG. 13) is joined to the portions of a plurality of drive lCs arrayed in line. For example, the anisotropic conductive film ACF2, formed into a single slender shape, is joined commonly to the drive ICs arrayed on the individual sides.

Next, a drive IC is held by vacuum suction on the pressing face of a bonding head, and the positions of the two bumps BUMP (or salient electrodes) to be laid over the alignment mark ALC are adjusted in a predetermined relative position relation by means of an image pickup camera. This positioning is made to bring the center of the bump BUMP of one side just into the center of the image plane, for example.

Next, the positions of the two alignment marks ALD on the transparent insulating substrate SUB1 are adjusted by the image pickup camera into a predetermined relative position relation. For example, this positioning is made to bring the center of the alignment marks ALD just into the center of the image plane.

As a result, the relative positions between the two bumps BUMP and the two alignment marks ALD are determined.

Next, on the basis of the relative position coordinates of the prestored alignment marks ALD and the bumps BUMP, the X-Y stage is moved to move the alignment marks ALD and the bumps BUMP over the image pickup face FACE, thereby performing the position detection. Ordinarily, the position correction is not performed at this step because the mechanical moving accuracy of the X-Y stage is far more excellent than the bonding accuracy.

Next, each drive IC is temporarily attached.

In this temporary attached state, the alignment between the bumps BUMP and the alignment marks ALD are then reconfirmed. If misalignment is detected at this stage, the X-Y stage is slightly moved to correct the positions because the drive IC is still temporarily attached.

Next, the bonding head is lowered to thermosetting-bond the plurality of drive ICs, normally, an array of drive ICs to the transparent insulating substrate SUB1, thereby electrically connecting the bumps BUMP of the drive ICs and the wiring patterns DTM (GTM) and Td (Tg) through the anisotropic conductive film ACF2.

Next, a bonding head HEAD is lifted to transfer the liquid crystal display panel carrying the drive ICs once from the bonding step to the testing step.

Next, at this inspecting step, the connected state of the bumps BUMP and the active state of the drive ICs are tested, using the not-shown testing pads. When any defect is detected, repairs are performed, if any.

Next, the anisotropic conductive film ACF1 (see FIG. 13) is joined to the input wiring pattern portion to the drive ICs. For example, the anisotropic conductive film formed into one slender shape is joined commonly to the drive ICs arrayed on each side.

Next, the liquid crystal panel PNL and the flexible substrate FPC are roughly fixed by bringing the holes, formed in the two ends of the flexible substrate FPC, onto fixing pins. In order to improve the alignment accuracy, moreover, the alignment marks (not-shown) provided on the flexible substrate FPC and the alignment marks ALC are aligned above the image pickup plane to correct the positions.

Next, the positions are confirmed again after temporary attachment.

Finally, the bonding head is further lowered to thermosetting-bond the flexible substrate FPC to the transparent insulating substrate SUB1 to electrically connect the flexible substrate FPC and the wiring pattern Td (Tg) of the transparent insulating substrate SUB1 through the anisotropic conductive film ACF1.

<<Manufacture Flow to TFT Substrate Manufacture and Flexible Substrate Mounting>>

Here will be described the flow for manufacturing the substrate (hereinafter abbreviated into the TFT substrate) SUB1 on the side where the thin film transistors are formed.

First, the TFT substrate SUB1 is fabricated (till the passivation film PSV1 is formed), as has been described in the <<Method of Fabricating Transparent Insulating Substrate SUB1 >>with reference to FIGS. 20 to 22.

Next, an alignment film is printed on the passivation film (designated by PSV1 of FIG. 22(G)) and is then rubbed.

Next, a seal member is printed on the peripheral edge of the substrate face of the transparent insulating substrate SUB1 or SUB2, and a plurality of spacers of small spherical beads for defining the gap between the two substrates are scattered over one substrate face. After this, the two substrates SUB1 and SUB2 are joined together and assembled by laying them one over the other through the seal member. After this, the periphery of the substrate SUB1 is cut.

Next, the space between the two substrates SUB1 and SUB2 in the region, as enclosed by the seal member, is filled with a liquid crystal through a liquid crystal sealing inlet having no seal member, and the sealing inlet is then sealed with a sealing material such as a resin.

Next, the testing probe is used to perform the lighting test, and the gate lines and the drain lines, if defective due to disconnection or short-circuit, are repaired.

The anisotropic conductive film (designated by ACF2 in FIG. 17) is joined to the non-defectives which are judged to be acceptable by the lighting tests.

Next, the drive ICs are temporarily attached to the transparent insulating substrate SUB1 through the anisotropic conductive film and are mounted thereon by thermosetting bonding (see FIG. 6 and FIG. 17).

Next, with the drive ICs mounted, a lighting test is performed by using the testing probe, and defective drive ICs are replaced with good ones.

The anisotropic conductive film (designated by ACF1 in FIG. 17) is joined to the drive ICs which are judged to be non-defectives as a result of the lighting tests.

Next, the flexible substrate (designated by FPC in FIG. 17) is mounted on the transparent insulating substrate SUB1 through the anisotropic conductive film.

<<Input Wiring Line Tg to Drive ICs>>

Figure 15:
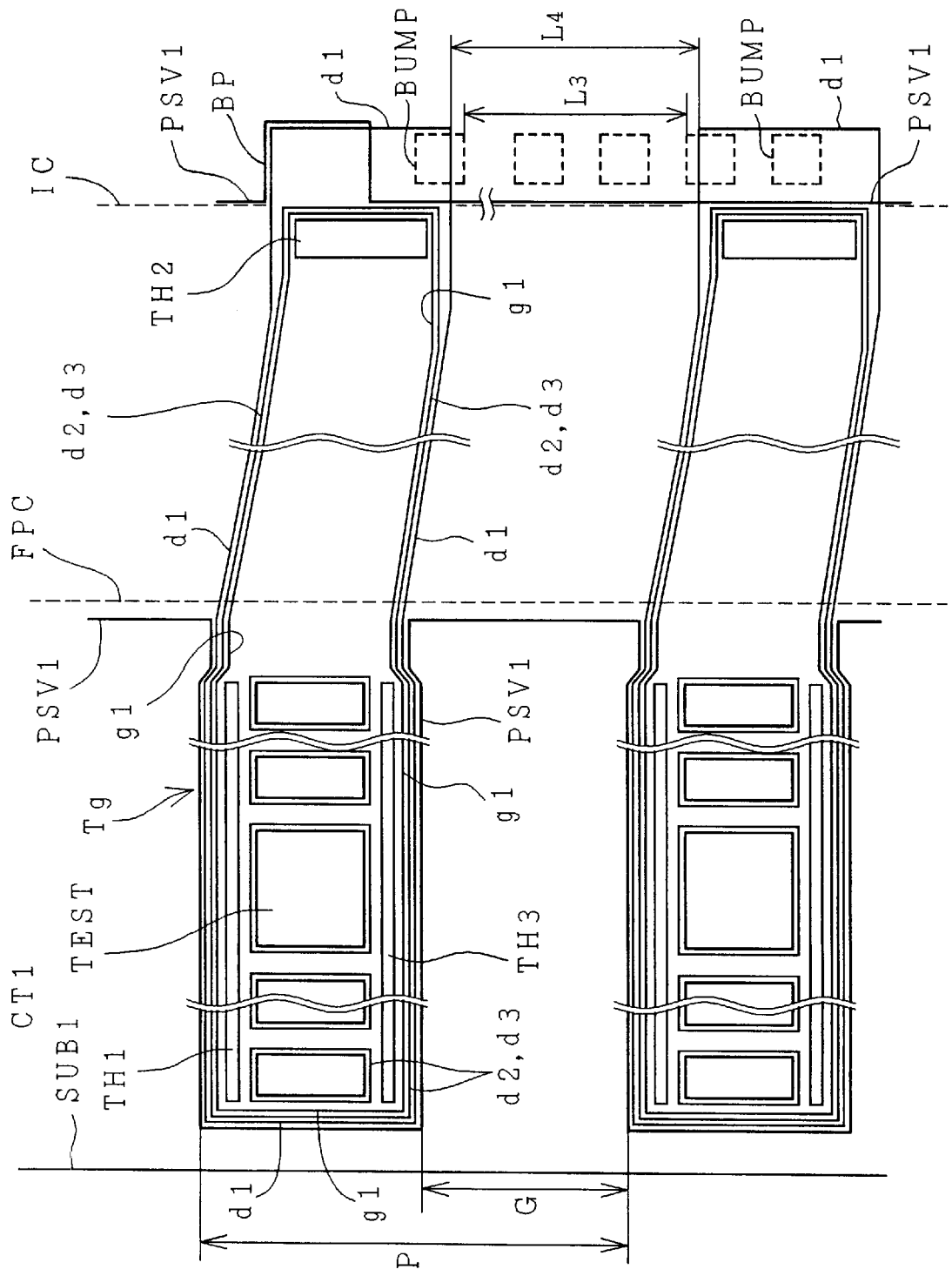
FIG. 15 is an enlarged top plan view of an input wiring line Tg to the gate scanning drive IC.

FIG. 15 is an enlarged top plan view of an input wiring line Tg to the gate scanning drive IC.

The input wiring line Tg to the drive ICs is composed, from its lower layer, of the first conducive film g1 formed at the same step as that of forming the gate electrodes and the gate lines and made of a low-resistance metal such as Al—Ta, Al—Ti—Ta or Al—Pd; the conductive film d1 formed at the same step as that of forming the transparent pixel electrodes of the display region and made of the ITO (Indium Tin Oxide) film; the second conductive film d2 formed at the same step as that of forming the source/drain electrodes of the thin film transistors and made of a low-resistance metal such as Cr; and the third conductive film d3 made of a low-resistance metal such as Al—Pd, Al—Si, Al—Ta or Al—Ti—Ta. The passivation film PSV1 of SiN or the like is formed over the input wiring line Tg so as to prevent electrolyte corrosion.

In FIG. 15, the positions on which the drive ICs are mounted are shown by a dotted line IC. Symbol BP designates a bump connector to which the bumps BUMP (shown in FIG. 17) of the drive ICs are bonded. The position (at one end portion) at which the flexible substrate (designated by symbol FPC in FIG. 17) for feeding the signals and the supply voltage from the outside to the drive ICs is connected and mounted, is shown by a dotted line FPC. At the portion of the input wiring line Tg connected with the output terminals of the flexible substrate, the second conductive film d2 and the third conductive film d3 are formed into a so-called "ladder shape", as shown in FIG. 15. The passivation film PSV1 is also formed into a larger ladder shape along the ladder-shaped second and third conductive films d2 and d3. Between the ladders of the ladder-shaped passivation film PSV1 exposed from the surface, specifically, there is exposed the transparent conductive film d1, the exposed portion of which is given a wider area used for the testing terminal (pad). Moreover, the whole exposed transparent conductive film d1 and the output terminals of the flexible substrate are directly connected. As seen from FIG. 15, the sizes of the individual conductive films constituting the input wiring line Tg are determined such that the lower first conductive film g1 is given the smallest size, i.e., is formed on the innermost side, the upper second and third conductive films d2 and d3 are given a second size (excepting the spaces between the ladders), and the transparent conductive film d1 is given the largest size, i.e., is formed on the outermost side. The bump connector BP of FIG. 15 is constructed of a single layer of the transparent conductive film d1 having an exposed surface.

The first conductive film g1 and the second conductive film d2 are connected through through-holes TH1, TH2 and TH3.

In FIG. 15, moreover, reference symbol P designates a terminal (the input wiring line Tg) pitch (of about 0.8 to 1.3 mm), and symbol G designates a terminal gap (interval) (of about 0.6 to 1.1 mm).

The input wiring line Tg for connecting the flexible substrate and the drive ICs is constructed to include the first conductive film g1 and the second and third conductive films d2 and d3 made of a low-resistance metal, and the first conductive film g1 and the second conductive film d2 sandwiching the transparent conductive film d1 having a high contact resistance with the low-resistance metal are connected through the through-holes TH1 to TH3, so that the input wiring line Tg can be lowered in its resistance to lower the resistance between the flexible substrate and the drive lCs.

The second conductive film d2 and the third conductive film d3 are formed into ladder shapes, and the transparent conductive film d1 which is highly stable and reluctant to be contaminated, oxidized and electrochemical corroded is exposed in the spaces between the ladders, so that the output terminals of the flexible substrate are connected at the portions of the transparent conductive film d1 having the exposed wide area. As a result, the contact resistance of the flexible substrate with the terminals can be reduced to realize a low resistance, thereby stabilizing the resistance even when the flexible substrate is misalignment longitudinally or transversely.

The ladder-shaped second and third conductive films d2 and d3 provided for low resistance and being liable to be electrochemical corroded are covered with the passivation film PSV1 for preventing electrolyte corrosion, and the transparent conductive film d1 which is highly stable and reluctant to be contaminated, oxidized and electrochemical corroded is exposed at the portion of the flexible substrate connected with the terminals. This makes it possible to improve the electrolyte corrosion resistance of the input wiring line Tg for connecting the flexible substrate and the drive lCs. As a result, the reliability of the product can be improved.

The second and third conductive films d2 and d3 at the portions of the input wiring line Tg connected with the output terminals of the flexible substrate are partially removed to form them into ladder shapes, and the transparent conductive film d1 is exposed between the spaces of the ladders. As described in the <<Manufacture Flow>>, therefore, the testing probe can be applied to the exposed portions of the transparent conductive film d1 after the mounting of the drive ICs and before the mounting of the flexible substrate, to perform the lighting tests, thereby judging whether the drive ICs is acceptable or defective.

The input wiring line (designated by symbol Td in FIG. 6 and FIG. 5) on the drain side are constructed like the input wiring line Tg shown in FIG. 15. As described above, however, the input wiring line Td and the drain short-circuiting line SHd are connected.

The ladder shape of FIG. 15 may be changed into a comb shape. In the ladder shape, two supports of the ladder constructed of the second and third conductive films d2 and d3 are provided for one terminal, and the second and third conductive films d2 and d3 occupying large areas are adjacent to the input wiring line Td. In the case of the comb shape, one support of the comb is provided for one terminal, so that the comb shape has an advantage that the resistance to the electrolyte corrosion is high. Moreover, the shape should not be limited to the ladder or comb shape, but the aforementioned effects can be achieved if the transparent conductive film d1 excepting its portion is covered with the second and third conductive films d2 and d3. Moreover, this structure of such ladder or comb shape can be applied to some of the terminals. The aforementioned materials for the first conductive film g1 and the second and third conductive films d2 and d3 are mere examples, and the second and third conductive films d2 and d3 may be formed of only one layer. In addition, the first conductive film g1 may be omitted.

FIG. 16 is a perspective view showing a method of bending and mounting a foldable multi-layered flexible substrate FPC in the liquid crystal display element.

The flexible substrate FPC is a bendable multi-layered structure which is electrically and mechanically connected with the end region of the lower transparent insulating substrate of the liquid crystal display element through the anisotropic conductive film (denoted by symbol ACF1 in FIG. 17) and which is mounted by bending it in the direction of arrows.

<<Output Wiring Line GTM Led out in Three Directions of Gate Scanning Drive ICs>>

Figure 12:
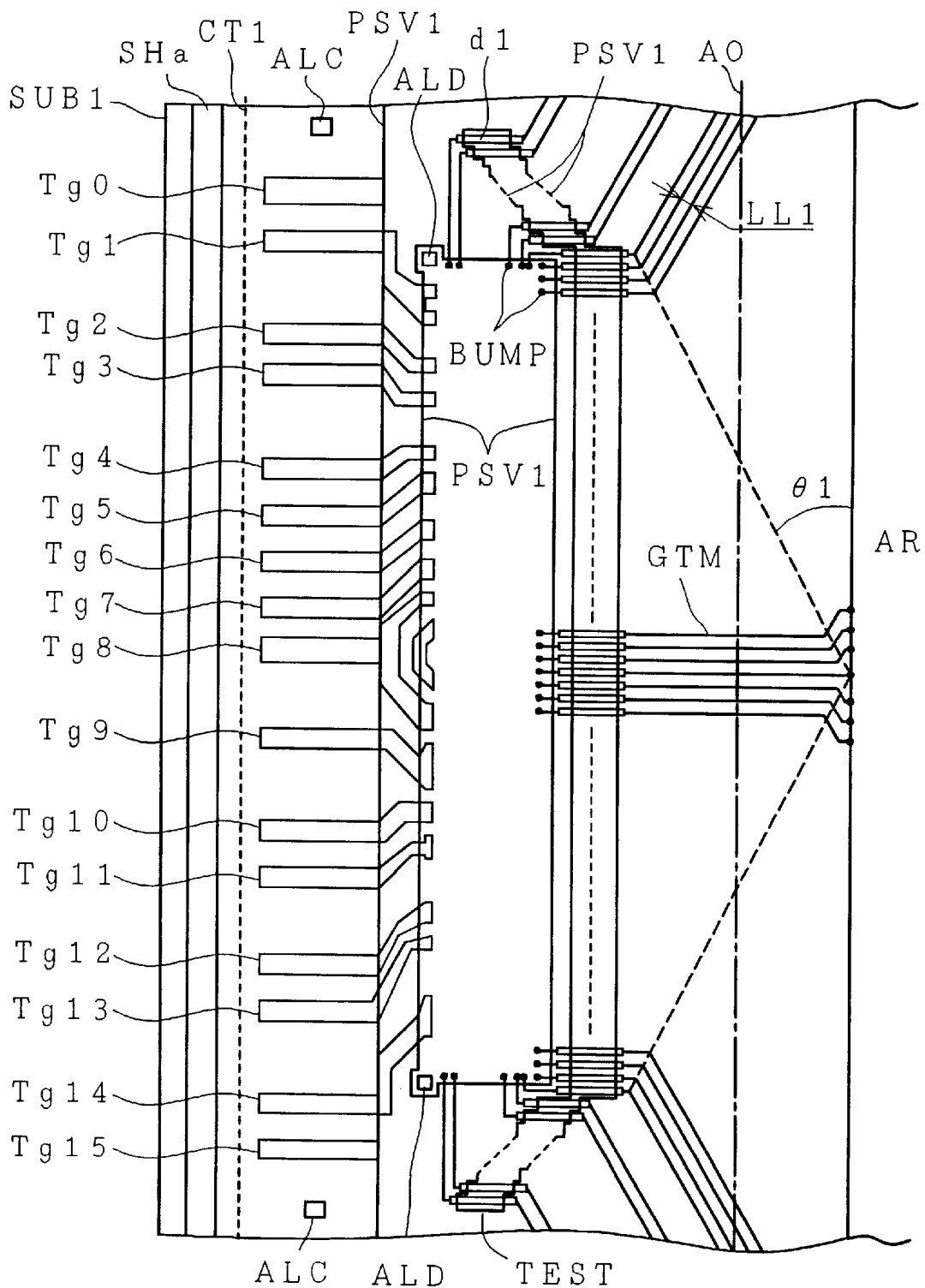
FIG. 12 is a top plan view of essential portions of a gate scanning drive IC mounting region of the substrate SUB1.

As shown in FIG. 12, the output wiring lines GTM for connecting the output bumps BUMP of the gate scanning drive IC and the gate lines GL of the effective display region AR are led out from the three, one long and two short sides of the ICs (hereinafter referred to as the three-direction lead-out). The output wiring lines GTM are connected with the gate lines GL of the effective display region AR through the testing pads TEST disposed near the ICs and through the straight and oblique wiring lines. Specifically, since the gap of the gate lines GL of the effective display region AR is larger than the gap of the output bumps BUMP of the gate scanning drive ICs, the output wiring lines GTM are connected between the output bumps BUMP and the effective display region AR through the oblique wiring lines diverging toward the effective display region AR.

The testing pads TEST are used commonly as the gate open circuit testing pads and the lighting testing pads for the gate open circuit and lighting tests. For the disconnection test, whether or not the gate lines GL including the output wiring lines GTM are disconnected is checked after the gate lines GL are formed, by bringing one testing probe into contact with the side of the gate short-circuiting line SHg (see FIG. 5) by which the individual gate lines GL are commonly short-circuited, and by bringing the other testing probe sequentially into contact with the individual testing pads TEST of the gate lines GL. For the lighting test, defect such as disconnection or short-circuit of the gate lines GL and the drain lines DL including the output wiring lines is detected by bringing the testing probe into contact with the whole testing pads TEST to light in the state of the liquid crystal cells with the liquid crystal being sealed between the substrates.

In the structure shown in FIG. 12, the testing pads TEST used commonly for testing the gate disconnecting and for testing the lighting of the output wiring lines GTM led out from the two short sides of the gate scanning drive ICs are shifted to the side opposed to the effective display region AR, i.e., to the left of FIG. 12. More specifically, the output wiring lines GTM are led out from the two short sides of the ICs perpendicularly to the short sides and are connected with the testing pads TEST arranged in parallel with the short sides, and the oblique wiring lines are diverged from the testing pads TEST toward the effective display region AR. As a result, the large angle θ1 of the oblique wiring lines can be taken to reduce the size of the oblique wiring line region. Alternatively, a large gap LL1 between the output wiring lines GTM can be taken. By making the disconnection testing pads and the lighting testing pads common, moreover, the oblique wiring lines can be elongated, reducing the size of the oblique wiring line region or enlarging the gap between the output wiring lines GTM. This is effective in reducing the external sizes of the liquid crystal display element and the liquid crystal display module and in enlarging the effective display region. Since the gap of the output wiring lines GTM can be enlarged, moreover, the resistance to the electrolyte corrosion can be improved.

<<Drain Side Output Wiring Lines>>

FIG. 11A is a top plan view showing an example of an output wiring line on the drain side.

FIG. 11 B is a section taken along line F—F of FIG. 11 A. At the joint portions between the drain lines DL of the effective display region AR and the output wiring lines the $N^+$-type amorphous Si film d0, the i-type amorphous Si film AS and the silicon nitride film GI are interposed between the transparent conductive films d1 and d2 and the sections of the joint portions are tapered shapes. Disconnection of the output wiring lines d2 and d3 due to the step of the transparent conductive film d1 in the case of direct connection is prevented.

Next, the outer side of the seal region is wired by employing only the transparent conductive film d1 which is relatively stable in the reliability.

In this embodiment, the output wiring lines are extended in three directions of the drive ICs in relation to the bumps BUMP of the drive lcs.

The wiring lines using the aforementioned transparent conductive film ITO are improved in their electrolyte corrosion resistance by covering them with the passivation film PSV1. In this embodiment, the testing pads TEST are provided in positions opposed to the effective display region AR and inside the seal region SL, and the passivation film PSV1 is holed. As a result, the transparent conductive film d1 is the highest layer, so that no metal flake is produced even if the probe needle comes into contact with the testing pads TEST, preventing defects such as short-circuit between the wiring lines or disconnection from the testing pads TEST.

<<Gate Side Output Wiring Lines>>

Figure 14:
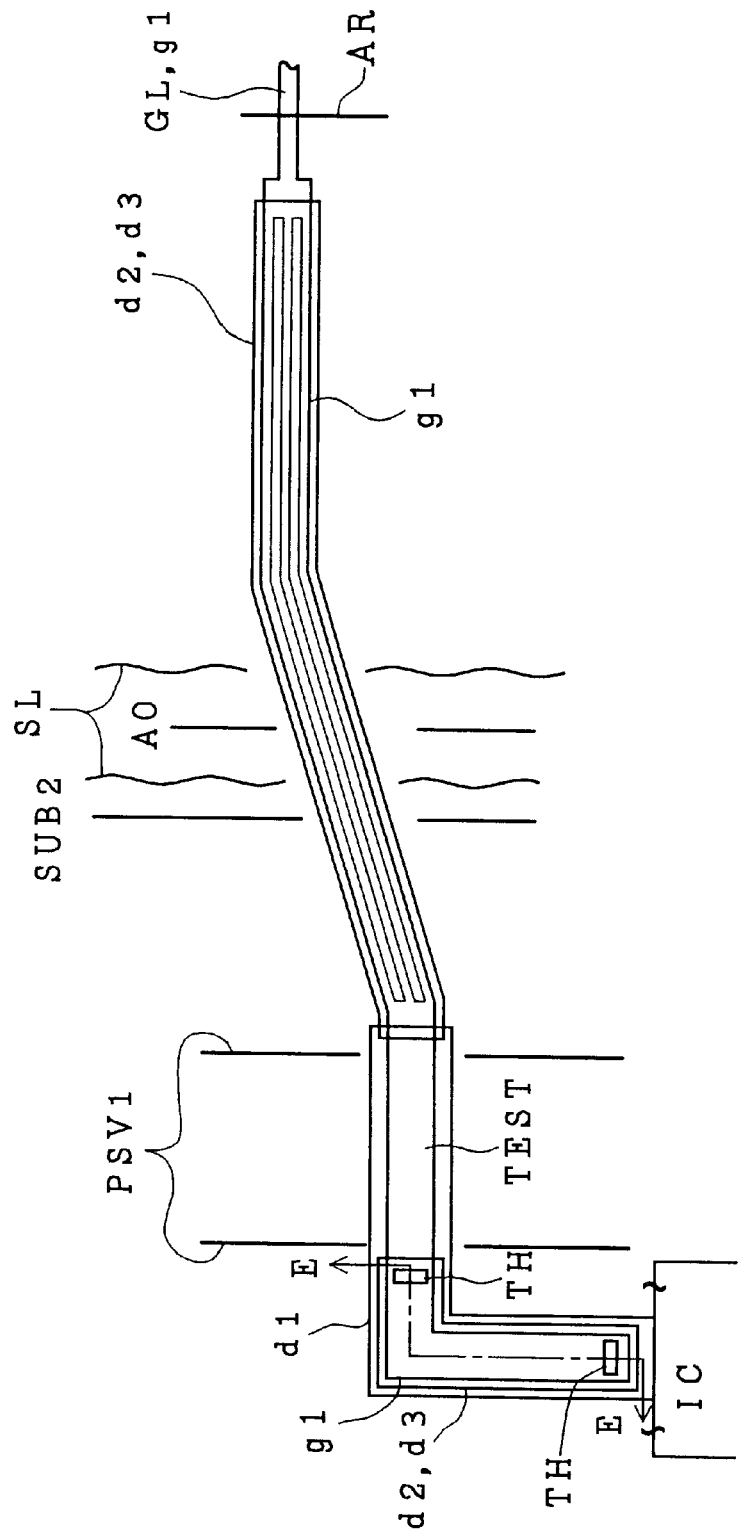
FIG. 14 is a top plan view showing an example of an output wiring line on the gate side.

FIG. 14 is a top plan view showing an example of an output wiring line on the gate side.

The amount of the distortion of the rise of the gate waveform as it is leads to the reduction in the writing time. On the gate side, therefore, it becomes necessary not only to reduce the variation in the wiring resistance but also to reduce the output wiring resistance itself.

In this embodiment, the gate wiring layer g1 containing aluminum is extended as long as possible to the outside of the seal SL to lower the resistance. In the periphery of the drive ICs, moreover, the gate wiring layer g1 containing aluminum is provided below the transparent conductive film d1 to connect the drain wiring layers d2 and d3 and the gate wiring layer g1 through through-holes TH thereby, lowering the resistance.

The anodized portion is on the righthand side of the anodizing line AO, and gate wiring layer go containing aluminum such as Al—Ta or Al—Ta—Ti exists on the lefthand side. As a result, the wiring lines of this region are thinned to about 10–15 μm reducing the probability of forming whiskers.

In this embodiment, moreover, the testing pads TEST are covered at the gate wiring layer g1 containing aluminum with the transparent conductive film d1, so that no metal flake is produced, even if the probe needle comes into contact with the testing pads TEST, thereby preventing short-circuit between the wiring lines and disconnection from the testing pads TEST.

<<Information Device in which Liquid Crystal Display Module MDL is Mounted>>

FIG. 27 is a perspective view of a notebook personal computer or word processor having the liquid crystal display module MDL mounted therein.

By adopting the COG mounting of the drive ICs on the liquid crystal panel PNL and the bending mounting of the multi-layered flexible substrate as a peripheral circuit for drain and gate drivers in the peripheral portion, the external size can be very drastically reduced than that of the prior art. In the embodiment, the drain driver peripheral circuit mounted on one side can be mounted on the upper side of the display region over the hinge of the information device, thereby realizing compact mounting.

The signals from the information device flow out at first from the connector positioned generally at the center of a lefthand interface substrate PCB, to a display control integrated circuit element (TCON) in which the signals are converted into display data, and the display data are vertically separated and fed into the drain driver peripheral circuit. By thus using the flip-chip system and the multi-layered flexible substrate, the restriction on the contour of the width of the information device can be eliminated, providing a small-sized low power consumption information device.

The invention has been specifically described with reference to the embodiments, but the invention should not be limited to the foregoing embodiments and can naturally be modified in various manners without departing from the gist thereof.

INDUSTRIAL APPLICABILITY

The invention can be applied to liquid crystals described hereinbefore, and can be practiced in the liquid crystal manufacturing industry.

What is claimed is:

1. A liquid crystal display device having an active matrix liquid crystal display element, comprising:
    a plurality of gate lines and a plurality of drain lines intersecting the gate lines through an insulating film, said gate lines and said drain lines being juxtaposed to each other over a face of one of two opposed transparent insulating substrates joined together through a liquid crystal layer;

a switching element being disposed in the vicinity of each of intersections between said gate lines and said drain lines; and resistor elements for connecting said drain lines being disposed inside a seal so that a distance between two conductor electrodes constituting said resistor elements between the drain lines is substantially equal to a minimum size of channel portions of thin film transistors constituting an effective pixel region.

2. A liquid crystal display device according to claim 1, wherein further resistor elements for connecting said gate lines or said drain lines are arranged outside the seal in addition to the resistor elements arranged inside the seal.

3. A liquid crystal display device according to claim 1, wherein said resistor elements include a semiconductor film having a photoconductivity.

4. A liquid crystal display device according to claim 1, wherein said distance between two conductor electrodes constituting said resistor elements is in a range of about 4 to 40 microns.

5. A liquid crystal display device having an active matrix liquid crystal display element of a flip-chip type, comprising:

first resistor elements for connecting drain lines, said first resistor elements being disposed inside a seal, and being arranged in one or more lines; and second resistor elements for connecting gate lines or drain lines being arranged outside of said seal, said second resistor elements being disposed at an adjacent side of outputs of drive ICs;

wherein a distance of said first resistor elements between two of the drain lines is substantially equal to a minimum size of channel portions of thin film transistors constituting an effective pixel region, and a distance of said second resistor elements between two of the gate lines or drain lines is in a range of about 30 to 100 microns.

6. A liquid crystal display device according to claim 5, wherein said distance of said first resistor elements between two of the drain lines is in a range of about 4 to 40 microns.

* * * * *